US006901301B2

(12) United States Patent
Bradshaw

(10) Patent No.: US 6,901,301 B2
(45) Date of Patent: May 31, 2005

(54) COMPUTERIZED EMPLOYEE EVALUATION PROCESSING APPARATUS AND METHOD

(76) Inventor: William Brent Bradshaw, 954 E. 1000 North, Pleasant Grove, UT (US) 84062

(*) Notice: Subject to any disclaimer, the term of this patent is extended or adjusted under 35 U.S.C. 154(b) by 45 days.

(21) Appl. No.: 10/666,106

(22) Filed: Sep. 18, 2003

(65) Prior Publication Data

US 2004/0060051 A1 Mar. 25, 2004

Related U.S. Application Data

(60) Provisional application No. 60/411,704, filed on Sep. 19, 2002.

(51) Int. Cl.⁷ ............................................. G05B 13/02
(52) U.S. Cl. ............................... 700/48; 700/1; 700/47; 706/45; 706/50; 706/61; 703/2; 703/22
(58) Field of Search .............................. 700/1, 48, 47; 706/45, 50, 61; 703/2, 22

(56) References Cited

U.S. PATENT DOCUMENTS

| | | | | |
|---|---|---|---|---|
| 4,829,297 A | * | 5/1989 | Ilg et al. ...................... | 370/449 |
| 5,737,626 A | * | 4/1998 | Hall et al. ...................... | 712/1 |
| 5,764,856 A | * | 6/1998 | Jaenecke ...................... | 706/27 |
| 5,799,311 A | * | 8/1998 | Agrawal et al. ............. | 707/102 |
| 6,151,565 A | * | 11/2000 | Lobley et al. .................. | 703/2 |
| 6,209,019 B1 | * | 3/2001 | Okataku et al. ............. | 718/107 |

OTHER PUBLICATIONS

Anthony Robbins, *Unlimited Power*, pp 204–215, Simon and Schuster, 1986.
Stephen R. Covey, *The 7 Habits of Highly Effective People*, pp48, 55, 306, Fireside & Simon and Schuster, 1989.
Richard M. Astle, *The Commonsense MBA*, pp39–65, St. Martin's Griffin, 1994.
Stephen J. Hoch et al., *Wharton on Making Decisions*, pp131–155, John Wiley & Sons, Inc., 2001.

* cited by examiner

*Primary Examiner*—Ramesh Patel
(74) *Attorney, Agent, or Firm*—Pate Pierce & Baird

(57) ABSTRACT

A method for computerized industrial process control provides computers networked to communicate with one another. Each computer active in the system is responsbile for at least a portion of the process and at least one decision for a process to be controlled and having an output. All activities are characterized by type, the types of activities forming a universal set including sensing facts, linking facts into a meaningful context, and evaluating meaning to formulate a decision. An entity responsible for an assigned decision conducts a series of activities selected from the three types, which may be applied recursively. Decisions are communicated between computers through the system to control the process. Producing output from the process follows according to a combination of decisions reported from each computer corresponding to a responsible person or other entity. In various embodiments, the process control may be hardware product development, manufacturing, chemical composition processing, or data collection and processing such as from instruments and machines or computerized information processes including employee evaluation.

20 Claims, 17 Drawing Sheets

| SEE 238a | THINK 238b | DO 238c |
|---|---|---|
| CONTENT 267a | CONTEXT 267b | PROCESS 267c |
| SURVEY 268a | ORGANIZE 268b | PROPOSE 268c |
| LEAD 237a | DIRECT 237b | MANAGE 237c |
| SENSE FACTS 269a | LINK FACTS 269b | EVALUATE 269c |
| ELEMENTAL 239a | MENTAL 239b | PHYSICAL 239c |

COMPUTERIZED EMPLOYEE EVALUATION PROCESSING APPARATUS AND METHOD

RELATED APPLICATIONS

This application claims the benefit of U.S. Provisional Application Ser. No. 60/411,704, filed Sep. 19, 2002.

BACKGROUND

1. The Field of the Invention

This invention relates to computerized collection and processing of data and, more particularly, to novel systems and methods for industrial process control.

2. The Background Art

People in the business of manufacturing products, companies producing services, entities that harvest resources for sale, and the like often believe that their business operates on actions. People and organizations alike often mistake activity for the core of their business. Doing physical activities that produce an obvious and measurable output, product, or dollar value are often credited with the success of a business. Nevertheless, behind every business activity lie decisions made and implemented in order to achieve each consequent result.

Companies are always interested in improving their productivity, profitability, outputs, and other measures of compensation. As a result, a major resource in the many business entities and environments is the human resource. Human resources, unlike machines, have opinions and feelings of their own. Human beings have opinions with respect to one another on nearly any subject held in common. That is, individuals have opinions as to their own value in an organization, their own value in their roles, their own values to the overall operation. Similarly, human beings typically have opinions as to the relative values of others to an organization, to a task, to any endeavor with which associated.

Human resources are often evaluated in subjective terms. Subjectivity creates immediate conflict in many instances due to a reviewer and a reviewed person making evaluations based on differing criteria, differing events, and different views of facts. Employee management, training, education, employment, evaluation, and the like are often not reliable, repeatable, or objective, despite claims to being all of the above and more in terms of fairness. What is needed is a system and method for providing reliable, repeatable, useful employee evaluations. Moreover, employee evaluations often take excessive amounts of time, attention, emotional cost, and the like. Evaluations are often responsible for employees' frustration, employees' attitudes, and so forth. Likewise, employee evaluations typically take excessive amounts of time away from other administrative tasks. Nevertheless, few can doubt the importance of human resources and the proper evaluation and management thereof.

Therefore, it would be very helpful to obtain a system for evaluating employees in which employees evaluations require a minimal amount of time. Rather than days, weeks, and even months for execution of employee evaluation processes, a simple straight forward approach using computers, both to collect data and process data, would be extremely useful. Moreover, if an employee evaluation system were both reliable, repeatable, substantially objective, normalized over a broad base of opinions, accurately and quickly executed, and accurately and quickly processed to provide meaningful outputs, such a system would be an extremely valuable advance in the state of the art.

What is needed is a system that provides a system of criteria that can cover many and varied situations, repeatably, through multiple evaluations, provide meaningful results, that can be implemented both by management, and in training or sustaining individuals in a work force. Such a system implemented on computers whereby employee investment in time and emotions is minimized, and management investment in understanding, justifying, reporting, negotiating, and discussing both inputs and results can be minimized.

What is needed likewise is a set of criteria on the basis of which an employee evaluation system may be founded. A set o criteria that can cover all situations, at all levels of an organization, over all levels of responsibility and over all entities within a business, whether organizations, suborganizations, individuals, or the like, such a system would be universally valuable as it would be universally applicable.

Since businesses operate based on various operational priorities with various organizational structures, capital expenditures and distributions of overhead expenses (e.g. machinery, real estate, other resources, etc.) a universal management style seems impossible. Moreover, universal management and leaderhip criteria seem impossible to define. Various consultants have derived their own organizational theories, some tried, some untried, to promote. Similarly, people who have been successful or organizations that have been successful are often consulted, venerated, or deified as experts on all aspects of management or industrial success. Various consultants work on detailed analysis of physical steps executed by workers in a factory. Other consultants operate on the mental attitudes within organizations and individuals. Yet other experts operate on information flow. Other experts operate to improve capital expenditures and the management thereof. Yet other experts operate on improving communication processes. Thus, various areas of focus each attempt to solve all of the problems of management.

Most management techniques reduce to simple money management techniques. Many business schools are complained of in industry as producing only people who understand principle and interest. Allocation of capital assets is not the only factor, especially when human resources, the variability of people, and the variability of particular situations must be taken into account. All the world is not a bank. Many businesses still must manage people, products, markets, and customers.

Management consultants, managers, and other evangelists of particular approaches to management often preach a style of management or leadership that suited their particular organization, time, product, market, industry, personnel, or the like. Styles of management or leadership do not necessarily translate to other situations, personnel, and the like. Many "principles" and "secrets" of management, and success amount to little more than stylistic preferences that suit personalities and organizations in which they were successful before. Moreover, many other aspects of success may have been ignored, while the full success attribution was given to a particular portion or element implemented.

Many business realize the importance of their decision processes. Therefore, many businesses seek help from management, consultants, and the like to assist in improving decision processes. Many decision methodologies are evangelized by professors, consultants, university business departments, and the like. Nevertheless, all decisions in an organization are not equal. Moreover, all decisions cannot be handled in exactly the same way. It has been found that each decision made by an organization or individual depends on many decisions that were made previously. Likewise, each decision made effects a host of downstream decisions.

One approach that has gained recent popularity is the concept of "decision frames." The process of using decision frames in order to couch a decision in its proper environment or context requires an identification and listing of contributions affecting a decision. However, contributions to a decision are treated as an infinite universe of facts, events, resources, personnel, issues, and the like that may affect a decision.

As such, the contribution to a decision becomes an infinitely large set of constraints, issues, or the like from which one arbitrarily picks those deemed to be most significant. Effectively, much of the structure the decision frames promise actually is illusory. Moreover, decision frame theory does not appear to distinguish one decision type from another, the sequencing of decisions that relate to one another, or the fact that different decisions have different import, require different processes or are used in different ways that may affect the decision.

What is needed, but deemed impossible by those in a position to preach management theories, is an exclusive set of decision types that fit every decision. Similarly, what is needed is an exhaustive set such that every decision can be made, every decision can be identified, and every decision can be covered by a set of decision types.

An important element of military strategy is focus. Similarly, in many businesses, focus becomes a success. One philosophical observation is that people who are not so bright actually succeed more often because they maintain their focus and do not get distracted by other alternatives and opportunities. That is, many businesses and people succeed due to a focus or harping on a single point.

Much of management consulting amounts merely to motivation. That is, many consultants identify a particular principle, often a single principle, and then simply prompt motivation to focus on that principle and not forget it. Accordingly, they leave to the "student" the exercise of finding a way. Many businesses, with either negative or positive motivations believe that providing sufficient motivation will lead people to solve problems.

Many times people do solve problems. Nevertheless, problems continue to crop up that should not return, because they should have been handled properly in the first place. Thus, providing a single principle, and much motivation, expecting the "student to work out the details," is not necessarily good management practice, does not extend overall personality types, and is difficult to implement in an organization of any size.

What is needed is a system and method whereby a more balanced view of all decisions and activities can be kept in focus at once, so that a weak area is not allowed to hold its strong area hostage. A very visible principle is not allowed to obscure a less understood principle and a misunderstood principle is not allowed to hold hostage great principles that are failing in implementation.

Some industrial processes are defined to the extent that they sequence certain events, activities, or decisions. For example, modern software development acknowledges the need to establish requirements for software, function and performance before beginning coding. Similarly, testing logically follows completion of coding, and is inappropriate before.

BRIEF SUMMARY AND OBJECTS OF THE INVENTION

Consistent with the foregoing objects, and in accordance with the invention as embodied and broadly described herein, a method and apparatus are disclosed in one embodiment of the present invention as including a computerized process control for an industrial process.

In one embodiment of an apparatus and method in accordance with the invention, a computerized industrial process control may provide a system of computers networked to communicate with one another. Each computer may be selectively activated to cooperatively operate and communicate with other computers in the system. Each computer may include a processor, a memory device operably connected thereto, and a network connection for communicating with the other computers in the system.

In certain embodiments, a process may be selected to be controlled. An output may include a product, a composition, a condition, or the like in an industrial environment.

The process may select an entity corresponding to each computer within the networked system of computers to be responsible for a portion of the process responsible for producing output. Each entity is responsible for at least one decision. Even a decision to operate or not operate is a decision that may be made by an entity. Typically, an entity may be a machine, an organization, a person, or an object linked to the computer, and to the system.

In one embodiment, the system may provide a universal set of types of activities. The types include sensing facts, linking facts, and evaluating facts in preparation for a decision. Sensing, linking, and evaluating correspond to seeing, thinking, and doing as executed by human beings. Nevertheless, facts, links of facts with each other into a meaningful context, and linking of various contexts to provide a broader context result in meaning and significance for facts.

In one contemplated embodiment, a system and method in accordance with the invention input facts to each entity, after which each entity executes a series of specific activities from the palette of universal types (e.g. sensing, linking, evaluating). Typically, the activity types may apply in pairs. That is, many activities have responsibilities or components that belong to two of the types of activities. In fact, a universal, general, recursive set of types is sensing, linking, and evaluating, operated in sequence. Such a system may be part of a recursion from above in a broader context, and may recurse downward to more detailed context.

Each entity eventually outputs at least one assigned decision through the computer to the system. Accordingly, the various decisions are all contributions to the overall functioning of the controlled process. The controlled process may be the entire process of an enterprise. In an alternative embodiment, the process is a chemical manufacturing process. In other embodiments, the process is a product development process. Likewise, a product manufacturing process may be executed in accordance with the invention.

Ultimately, the assigned decisions are communicated through a computer system between entities. Decisions, the process of making the decisions, and the output of decisions, along with implementation plans are output from each entity responsible for a decision to another entity responsible for using those inputs to execute its own decisions and operations. Likewise, each entity responsible for a decision communicates back to those from which a task or decision was delegated in order to coordinate. Ultimately, the system produces an output from the process according to a combination of all of the decisions from the entities responsible, agglomerated through a computer system communicating between the entities.

In one embodiment, a business enterprise, whether it be manufacturing chemical compositions, manufactured products, or services, may be evaluated according to its adherence to the universal set of recursively connected decisions and activities. Likewise, individuals and organizations may be evaluated on their adherence to the process, and their results obtained.

In one embodiment, a basic recursive element containing each of three types of activities (e.g. sensing, linking, and evaluating) recurses into a matrix of nine activities that may be identified. Each activity includes an instantiation of sensing, linking, and evaluating. Each instantiation includes at least one decision. Each of the instantiations may recurse downward into more detail, and may be part of a recursion upward into an agglomeration by a larger organization, stewardship, or domain of interest.

Since an organization, process, product, development, operation, or the like may operate according to a palate of nine well defined decisions, with their methods of reaching decisions and implementing those decisions, individuals, organizations, and enterprises or other entities can be evaluated according to their adherence and results obtained from executing the nine decisions, their supporting activities in making them, and their subsequent activities in implementing them.

The output of a process in accordance with the invention may be a device, a computer program, a computer application, information, a service, an action, a machine, a composition of matter, energy, or the like. Likewise, an entity responsible for an element of the matrix of decisions may be selected from a person or thing. For example, an entity may be a person, an organization, a company, a vendor, a milling machine, a lathe, a drill, a press, a printer, a computer, a chemical reaction, a manufacturing production line, or the like.

In an apparatus and method in accordance with the invention, a limited universe or set of decisions is provided. That set of decisions provides an exclusive and exhaustive set of decisions, an exclusive and exhaustive set of relationships between decisions, and a unique, reliable, consistent sequencing of decisions with respect to one another. Moreover, the relationship between a set of nine decisions is such that all eight decisions not in question at a given time form the environment or define an environment for the ninth decision of interest.

Thus, a system of nine decisions, each with its process for accumulating information to make the decision, a process for making the decision, and a process for implementing the decision are included in the system. Moreover, the fundamental building block of decisions may be represented as a single recursive unit that can be repeated (e.g. nested) downward within a decision to further dissect a decision into sub-elements or sub-decisions that will lead to the decision in question. Moreover, the basic unit may be recursed upward to a broader level or a broader stewardship scope built up from smaller decisions. Thus, a universal, recursive, generalized process for making decisions is presented in a closed set of decisions and associated processes for reaching them and implementing them.

The decision process in modern business may be executed by a single person, by an entity, by an organization, or the like. In a system and method in accordance with the invention, collaborative development of products, processes, and the like may be done collaboratively by individuals within an organization over a computer network. That is, once a universal, recursive, closed set of decisions and associated processes for reaching them and implementing them has been created, with sufficiently clear definitions of roles and relationships as well as activities, collaborative efforts over a network by multiple entities may be a reality and not a system's engineering nightmare.

Since a system for product control, product development processes, software development processes, collaborative decision making, collaborative manufacturing and design, and the like may be embodied as an implementation of a system and method in accordance with the invention, personnel evaluations become a greatly simplified matter. That is, since all decisions can be identified, entities associated with those decisions can be identified, and the processes for making decisions and implementing them can be identified, then individuals and organizations can be held accountable for their decisions and implementation therefor. A personnel evaluation system in accordance with the invention assesses the ability and the actual execution of each person and organization in preparing for, executing, and implementing the decisions within the purview of the scope of their job.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 11 is a chart illustrating a correspondence between selected activities, tasks, roles, and objects in accordance with FIG. 10;

DETAILED DESCRIPTION OF THE PREFERRED EMBODIMENTS

Figure 1:
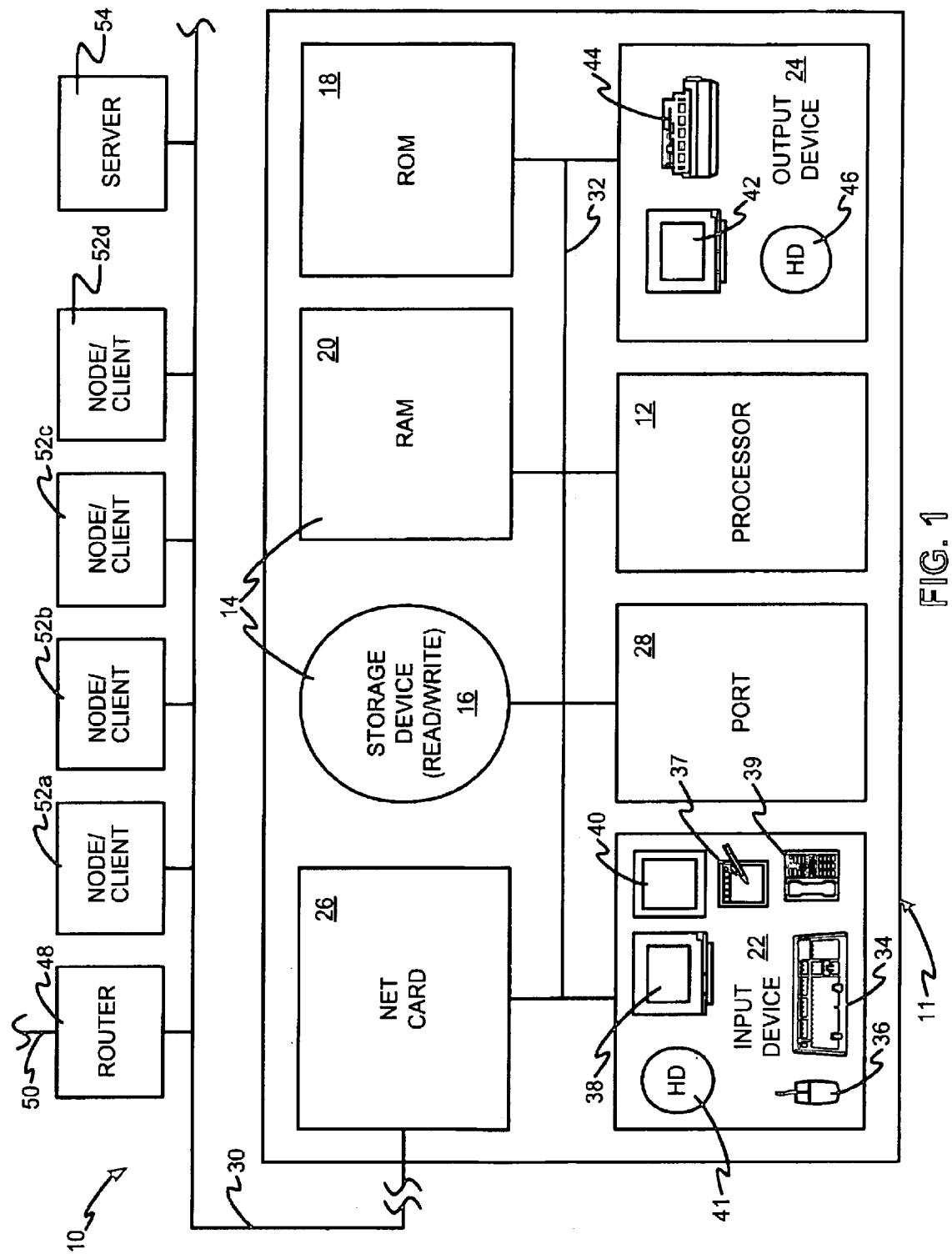
FIG. 1 is a schematic block diagram of a computer system in network in accordance with the invention.

It will be readily understood that the components of the present invention, as generally described and illustrated in the Figures herein, could be arranged and designed in a wide variety of different configurations. Thus, the following more detailed description of the embodiments of systems and methods in accordance with the present invention, as represented in FIGS. 1 through 17, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Language is useful but inherently limiting. Words have multiple meanings, yet those meanings are often imprecise or inadequate. Nevertheless, as to terms used in the matrix of elements herein, the following definitions will apply.

Vision is an active mental "image" of a thing believed to have attainable value—real vision initiates and sustains action but does not, of itself, define what to do or how to do it, leaving those details for later definition. Vision is the result of discovering things tangible or abstract, assigning them negative or positive values, and then believing and illuminating them for all involved to avoid, ignore, or pursue.

Connections are committed relationships between two or more entities typically aligned in an organized framework to achieve a common vision. Communication, transportation, cooperation, coordination and so on are examples of connections. Connections are the result of establishing and cultivating the right interactions between every factor necessary to effectively and efficiently achieve a vision.

Resources are building blocks necessary to support all steps of a process. Knowledge, information, personnel, skills, abilities, tools, time, space, money, energy, materials, machinery, buildings and so on are all examples of resources. Resources are the result of developing everything building block needed to achieve the vision and of allocating them appropriately.

Issues are criteria believed to define desired outcomes (benefits) relating to separately identifiable problems or opportunities. Issues support a vision but do not necessarily suggest how that outcome is to be achieved. Issues are the result of exploring problems and opportunities and refining them into believable benefits and criteria to clarify a focus for achieving a vision.

Objectives are committed outcomes that are balanced and organized within an overall strategy, which may or may not address all considered issues. Objectives are the result of organizing a cohesive strategy to align all relevant issues and then of committing to pursue and achieve the outcomes therein.

Ideas are potential "bridges" to connect objectives with specific activities or designs so as to achieve a desired result—ideas may be either original or borrowed. Ideas are the result of stimulating the intellect, searching other sources for solutions to the objectives and then exploiting those ideas to their full advantage for achieving the vision.

Constraints are substantiated costs, hurdles and other limitations that define what is required to implement specific ideas for related objectives. Constraints are the result of studying costs and obstacles for all feasible options an then selecting the best ideas, justifying them in light of their benefits and vision.

Projects are committed, correlated actions that use resources to follow a unified plan to produce products or services consistent with the preceding decisions and specifications, which may exclude some ideas and constraints previously considered. Projects are the result of designing specific, profitable plans and then summarizing all costs, procedures and details necessary to direct efforts to achieve the vision.

Compensation is anything exchanged for products and services that are produced according to plans consistent with the preceding steps. Compensation is the result of executing a plan so that it satisfies vision, issues, constraints, and all other decisions leading up to that point.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM 18) and a random access (and usually volatile) memory 20 (RAM 20 or operational memory 20).

The apparatus 10 may include an input device 22 for receiving inputs from a user or from another device. Similarly, an output device 24 may be provided within the node 11, or accessible within the apparatus 10. A network card 26 (interface card) or port 28 may be provided for connecting to outside devices, such as the network 30.

Internally, a bus 32, or plurality of buses 32, may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telecommunications line 39, may be used for communication with other devices, with a user, or the like. Similarly, a scanner 40 may be used to receive graphical inputs, which may or may not be translated to other formats. The hard drive 41 or other memory device 41 may be used as an input device whether resident within the node 11 or some other node 52 (e.g. 52, 54, etc.) on the network 30, or from another network 50.

Output devices 24 may likewise include one or more physical hardware units. For example, in general, the port 28 may be used to accept inputs into and send outputs from the node 11. Nevertheless, a monitor 42 may provide outputs to a user for feedback during a process, or for assisting two-way communication between the processor 12 and a user. A printer 44, a hard drive 46, or other device may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 48, 52, 54) may have various communication capabilities.

In certain embodiments, a minimum of logical capability may be available in any node 52. Note that any of the individual nodes 11, 48, 52, 54 may be referred to, as may all together, as a node 11 or a node 52. Each may contain a processor 12 with more or less of the other components 14–46.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
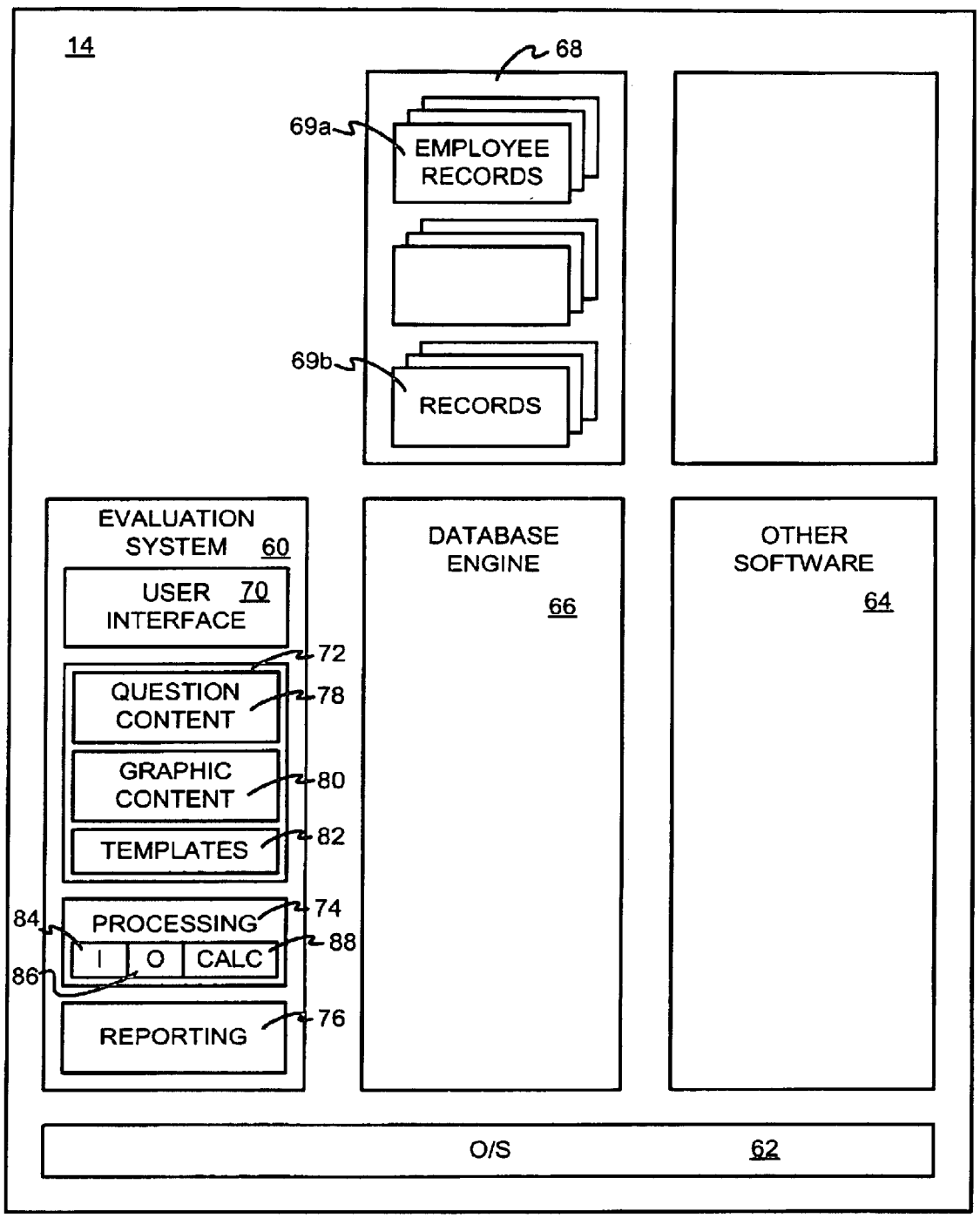
FIG. 2 is a schematic block diagram of a computer readable memory device loaded with executables and data implementing a system in accordance with the invention.

Referring to FIG. 2, a memory device 14 or a computer readable medium 14 may store various logical elements for operating in the system 10. For example, an evaluation system 60 may represent one embodiment of an apparatus and method in accordance with the present invention. The evaluation system 60 may be an application or system of applications 60 operating on an operating system 62 in a computer 11 within a system 10. Typically, other software 64 may operate on the same operating system 62. The evaluation system 60 may benefit from the use of an existing database engine 66. The data base engine 66 may be an independent system operated for other functions as well as support of evaluation system 60. In an alternative embodiment, the evaluation 60 may include a database engine 66 dedicated thereto.

In typical embodiments, a database engine 66 may operate to create, modify, and otherwise manage a set of records 68. In some embodiments, the records may include employee records 69a maintained for reasons other than those served by the evaluation system 60. In some embodiments, records 69b may be generated for and by the evaluation system 60. In other embodiments, the records 69b may simply be consolidated with employee records 69a maintained for other purposes. Nevertheless, in certain presently contemplated embodiments, the evaluation system 60 will engage a database 66 to create records 69b providing inputs and outputs supporting the evaluation system 60.

In one presently contemplated embodiment, a user interface 70 provided in the evaluation system 60 may interface with individual employees inputting into the system, supervisors inputting into the system and operating on data within the system, and administrators responsible for operation of the evaluation system 60. The user interface 70 may rely upon certain content files 72 or content 72. The content 72 may include operational data used by the user interface 70. That is, the user interface 70 may be thought of as the collection of executables responsible for operating the evaluation system 60. By contrast, the content 72 is information relied upon routinely by the user interface 70.

Additional executables may exist in a processing module 74. The processing module may be responsible for the operations of accepting inputs, producing outputs, and performing any calculations and manipulations of data in order to meet the objectives of the evaluation system 60. Typically, a reporting module 76 may produce reports to be transmitted electronically, printed, or otherwise distributed to participants and to those responsible for operating the evaluation system 60.

In one embodiment, the content 72 may include question content 78. Question content 78 includes, for example, text and data necessary to construct questions to be provided to a user. Similarly, graphic content 80 may be included to provide symbols, screens, images, and the like, as well as formatting and so forth. Templates 82 may include content 78 that does not change frequently, or graphics 80. However, typically, templates 82 may predominantly contain formatting information for agglomerating and using any of the content 72 may be used for the user interface 70.

The processing module 74 may include executables such as an input module 84 to handle the processing and management of inputs. Likewise, an output module 86 may handle the processing and direction of outputs. A calculation module 88 may include the routines for performing mathematical manipulations, statistical analyses, and the like as required in order to convert inputs to outputs.

Figure 3:
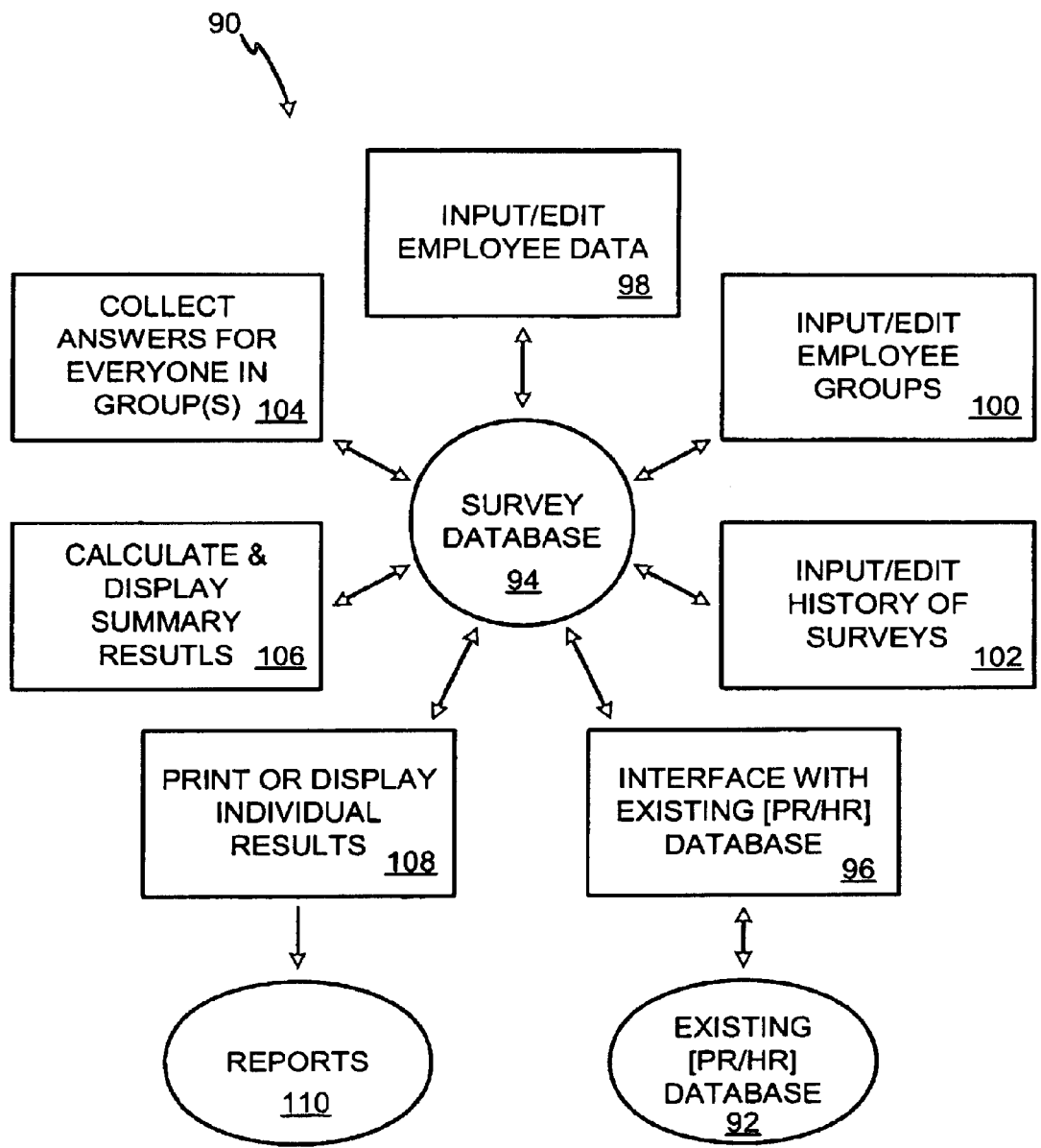
FIG. 3 is a schematic block diagram showing the interactions of the various logical portions of one embodiment of a system in accordance with the invention.

Referring to FIG. 3, one embodiment of a process 90 for implementing an evaluation system 60 on a computer 11 or system 10 may operate with an existing database 92, such as, for example, a personnel records database 92. As a practical matter, the process 90 or the evaluation system 60 may be used in a number of environments, including commercial product evaluations, university teaching situations, and the like. However, in one presently contemplated embodiment, the process 90 and the evaluation system 60 may be used for personnel evaluations within an organization, such as a company.

An existing database 92 may be augmented, or may be added to with a survey database 94. The survey database 94 may simply constitute certain fields within records in the existing database 92. In an alternative embodiment, the survey database 94 may be additional records in the database 92.

In yet another alternative embodiment, the survey database 94 may be constituted as a separate database operated by the same or another database engine with respect to the existing database 92. However, in certain contemplated embodiments, an advantage exists to working with records and a database 92 that already includes other employee information.

Accordingly, an interface 96 for cooperating between the existing database 92 and the survey database 94 may be implemented in a single engine, multiple engines, formatting and exchange protocols, or the like.

Employee evaluations are conducted in numerous ways. Current systems often rely only on highly confidential written documents, such as hardcopies of forms and reports. To the extent that an existing database 92 does not include records supporting the evaluation system 60, or to the extent that the existing database 92 does have records that can be used, or whose information can be used by the evaluation system 60, an input module 98 may support the input and editing of data corresponding to individuals, e.g. employees.

Inputs are directed in accordance with the question content 78 of the system 60. Additional details of the questions, answers, and the processing thereof will be discussed herein below.

Management schemes vary substantially between organizations. Some operations rely on a strict combination of personnel and functions mapped almost one-to-one in an organization. That is, employees and their roles are virtually inseparable. In other management embodiments, a matrix format is used.

For example, a program manager may be responsible for financial controls and functional accomplishments of a program, while other managers are responsible for personnel. In another example, an engineering manager may be regarded as a manager of certain engineering resources, constituting some amount of equipment and personnel providing certain services, skills, and so forth. A program manager may then contact an engineering manager and negotiate for the resources to accomplish a program's objectives.

In other management structures, ad hoc groups are constituted as task forces, product development groups, or the like. Individuals may work full time or part time within an organization. People may work for multiple organizations. Accordingly, a group module 100 provides for the input and editing of information defining groups. In certain contemplated embodiments, an individual employee may be evaluated within and by every group which that individual has a relationship. By the same token, an individual employee, supervisor, or the like may be requested to evaluate every person within every group in which that evaluator operates. Accordingly, the group module 100 provides for creation of groups and their constituent members.

Continuity is an important part of any ongoing relationship. Few relationships in life are as fraught with emotional investment as the employee-employer relationship. Continuity of the evaluation process 90 may therefore be important to an employer and an employee. Accordingly, a history module 102 may provide for the input and editing of a history of surveys or employee evaluations. For example, an employer may determine to conduct surveys or employee reviews monthly, quarterly, semiannually, annually, or the like. Accordingly, it is advisable to create records for receiving new data in a new instance of a review cycle, without destroying previous data. Moreover, it may be important to set up the history of surveys in such a way that old data may be used for comparisons in order to determine trends, progress, and the like.

A collection module 104 may be responsible to collect answers from each individual in each group. The collection module 104 may implement many of the details of the user interface 70 in order to present to each individual employee a series of appropriate questions, opportunities to edit, opportunities to make comments, and the like. Similarly, the collection module 104 may be implemented in certain embodiments to involve only management.

For example, in certain embodiments, managers may simply evaluate employees, rather than having every employee evaluate every other employee. Nevertheless, it has been found productive and tractable to have every member of a group evaluate every member of that group, in a 360 degree scope. That is, all members of a group may evaluate every other member of the group with whom they interact, whether that person is administratively above in a reporting chain, or below.

A calculation module 106 may provide for both the functions of the processing module 74, as well as a certain degree of user interaction. That is, the user interface 70 may be employed to support a calculation module 106 in order to present intermediate results or final results, and summaries of results, in order to allow preview or checking by an appropriate entity. That is, for example, a manager may desire to review inputs that he or she has provided, to make sure that no errors were made, that no clear outliers exist in the data.

Similarly, a manager may determine that based on the calculated outputs provided by the calculation and display module 106, that certain data appears to be inconsistent. Accordingly, a manager may choose to speak with employees who have input data that appears inconsistent with the inputs of others. Thus, an employee may be given the opportunity to correct erroneous inputs, or to justify the extreme variance of inputs from those of another employee or from those of the majority of employees.

A reporting module 108 may provide for the printing or display of individual results. Likewise, the reporting module 108 may also provide for group results. The reports 110 produced by the reporting module 108 may be adapted to feed back into both the history module 102 as well as the survey database 94, as well as the existing database 92, depending on the desired configuration.

Nevertheless, the reports 110 are typically the output upon which decisions are made. In some embodiments, the reporting module 108 may actually provide additional information that embodies the effects of evaluations. For example, in one embodiment, economic bonuses, promotion evaluations, points, or the like to be used in management decisions or employee interviews may be embodied in the reports 110.

In one presently contemplated embodiment, a report 110 may be an unsatisfactory ending point. It has been found that employees have a strong desire to correct errors, outlying evaluations, and other anomalies in data. Similarly, sometimes supervisors determine that it is required for good management or for compliance with legal concepts of fairness to assure that each employee acknowledges that he or she has reviewed the information in a report 110. Similarly, employers and employees may have a legitimate interest in assuring that the record reflects either an agreement or disagreement with the content of the report 110.

Accordingly, the calculation and display module 106 may provide for additional inputs by employees, employers, supervisors, or the like to augment the reports 110. One advantage to providing a calculation and display module 106 implementing aspects of the user interface 70 and the processing module 74 is to provide current updates from the databases 92, 94 at each time that a user, supervisor, employer, or the like accesses information. Records 68 and reports 110 may be updated with the latest data available in the databases 92, 94 before presentation and display by the module 106.

Figure 4:
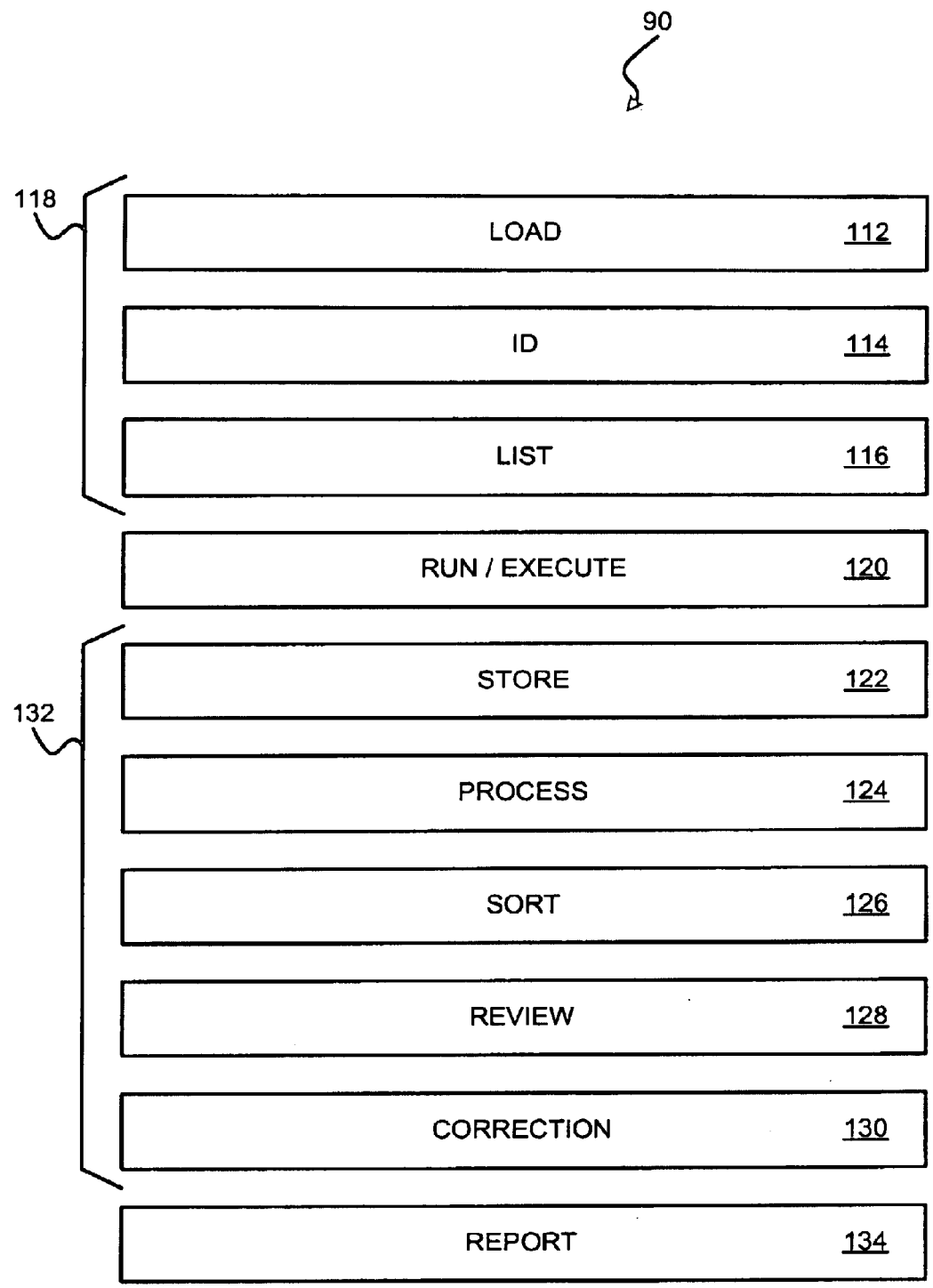
FIG. 4 is a schematic block diagram of one embodiment of a process implementing the invention as an employee evaluation program.

Referring to FIG. 4, a process 90 for employee evaluation may be viewed as a series of substantially sequential operations. For example, in one embodiment, a loading module 112 may be responsible to load a survey database 94 with employee data. Employee data may already include a universal identifier that is company-wide for each individual. Similarly, other identifiers that show links between individuals and organizations and between individuals and one another may also be included.

An identification module 114 may provide the identification of groups such as organizations, and populate each of the groups with entities. In some embodiments, groups may correspond to operational organizations. In other embodiments, groups may be embodied as lists of employees in certain locations. Again, the identification module 114 may depend upon the particular structure of an organization and the meaningful relationships that exist between people and an organization.

In one embodiment, the identification module 114 may treat all entities as entities. In general, human relations are an important part of any business. Nevertheless, relationships between machines, real estate, buildings, and other resources may also be significant. Accordingly, evaluation of resources in general may accommodate any entity that is organic to (associated with) a particular organization, structure, location, or the like. Accordingly, the identification module 114 may be tasked with the responsibility for identifying entities with groups. Typically, each employee is in at least one group. Nevertheless, the process 90 need not limit the number of groups into which a person may be included.

A listing module 116 may execute on a processor 12 to generate lists of citizens or members in each group identified by the identification module 114. Each individual in a group will need a list of the other entities (e.g. persons) in each group to be evaluated. Accordingly, an individual may receive a list from the listing module 116 for each group to which that individual pertains. In one presently contemplated embodiment, the listing module 116 may actually provide an electronic list to a user interface 70 to be presented to a user for evaluation. Accordingly, each group would have a list presented by the user interface 70 for evaluation of each of the persons therein in the context of the particular group being evaluated.

In certain embodiments, the steps embodied in the group 118 may typically be accomplished by systems and personnel from a human resources operation or an administrative function. Accordingly, the series 118 of steps may be executed by a person operating in an administrative function, in order to prepare for the employees execution of the run 120 or the execution 120 of the system 90. The execution 120 is explained in additional detail hereinbelow. Nevertheless, each employee or individual responsible for evaluating other entities will launch a software application to input evaluation data for each member of each list for which that individual is responsible to conduct an evaluation. The individual responsible for the execution 120 on his or her own behalf will typically be provided space to make comments that may be linked to data for individual members of the group by name.

In certain embodiments, an employee may be requested to conduct a self-evaluation. Some organizations seek complete independence of evaluations by not permitting an interested party to make an evaluation of self. Nevertheless, in certain embodiments of an apparatus and method in accordance with the invention, a self-evaluation can be used to great advantage to provide a benchmark or the like for normalization of data. Moreover, in view of the evaluations by others, a self-evaluation may also be very telling, providing much information to a supervisor and to an individual.

A store process 122 may save out to a hard drive or to a database 92, 94 the information collected during the execution 120. Typically, processing 124 may include intervention by an administrator or supervisor authorized to engage the program in order to process all records accumulated for each person. Similarly, the processing module 124 may include evaluation of averages, the evaluation of averages on each question, averaging over employees, and the like. The processing step 124 may include calculation of any deviation from a norm by an individual's self-evaluation.

In one embodiment, an average deviation of an individual's self-evaluation from the universal evaluation result received from others may be used to identify a degree of delusion or a delusion factor. One will note here that the scores correspond to different questions. Thus, despite using the same scale, the questions represent heterogeneous information. Therefore, the term deviation here is not necessarily rigorous in a statistical sense. Similarly, differences may be calculated between a self-rating in each of the nine categories available, and an absolute value of the deviation between the average of all evaluations, and the value of the individual evaluation may be calculated. Similarly, all of the absolute values may be averaged to determine a delusion factor. As a practical matter, an employer may determine to meet with an employee to discuss the actual values associated with a delusion factor. That is, for example, an employee may be consistently low in evaluating himself or herself.

Alternatively, an employee may be consistently high in evaluating himself. In yet another situation, an employee may be very high compared to the ratings of others in certain areas, and very low in evaluating himself or herself in other areas with respect to the average evaluations. Accordingly, a delusion factor simply provides a measure of consistency between one's evaluation of oneself, and the evaluation by others. However, individual degrees of delusion on any particular topic may provide impetus and information for correction of perceptions, actions, or the like by employees.

A balance index may be calculated as an overall difference between the average self-evaluation, and the average evaluation by others. That is, whereas a delusion factor is an average, absolute value of the difference in each category between an individual's evaluation of self and the evaluation by others, balance is a more gross term. The balance index is simply the average between self-evaluation compared with the average of group evaluation of self.

Delusion factors are always positive, having been derived from absolute values. By contrast, a balance index may be positive or negative. A negative balance index may indicate difficulties with self-esteem. A positive balance index may indicate difficulties with misperception and inflated ego. Accordingly, a desirable balance index has a value at or near zero. Likewise, a delusion factor is most desirable at a value of zero. Since the balance index is an average over all nine categories, a balance index value of zero can coexist with a high positive value of delusion factor. In some respects, one may think of a balance index as providing some give and take for accuracies and inaccuracies of evaluations. However, the delusion factor emphasizes the degree to which one's self-evaluation is simply different from those of others.

The processing step 124 may include any other statistically recognized evaluations desired. That is, given a set of data, various versions of averaging, taking variances, finding trends, and the like may result from conventional statistical analysis. Some presently contemplated analyses having particular utility include a ranking by number, a ranking by percentile, ranking within each category of questions, ranking over all questions, a comparison of one's score with the average score may conducted with respect to any individual question area or across all questions. Also, a point system or economic incentive system may be tied to a ranking. For example, a calculation for division of a bonus pool or a discretionary fund among several employees may be tied to the output of the ranking system.

In one presently contemplated embodiment, the processing step 124 includes a normalization of rating value normalized by salary value. That is, since the questions are related to a person's role and responsibilities and contributions to an organization, they may be tied directly to salaries. If points are normalized by salaries, then a benefit per dollar of salary may be output. Discrepancies in the relative contributions when compared with the relative salaries may be readily evident from the processing 124.

The sorting step 126 or sorting module 126 may engage the processor 12 to sort the list of employees with their scores, rankings, or both. For example, the human mind has a great capacity to see inconsistencies. Although one may not have the hand coordination to sand and paint a surface smoothly, the eye and brain can quickly determine whether any anomalies exist on the surface, and with a fine degree of accuracy. Similarly, the sorting module 126 or the sorting step 126 may order a series of evaluation scores in order that a supervisor, administrator, employer, or the like may determine whether any of the resulting output appears to be inconsistent with reality, or with other outputs.

A review step 128 is typically a responsibility of a supervisory or administrative person. That is, a review of data, reports, scores, and comments may be conducted together. Comments are difficult for a computer to process. Some would argue that a computer cannot process comments. Nevertheless, a comment may offer, for example, a mitigating explanation or context for a bear number existing in an individual rating or score. Accordingly, a review step 128 may be important to imperative for a supervisor or administrator prior to discussing a report rating with an individual.

Good employment practices emphasize positive development as opposed to negative judgment. In the system 60 in accordance with the invention, and the process 90, employees who report or evaluate are encouraged to provide specific and positive inputs by way of comments. Even though an individual may receive a low score in a particular area from a particular evaluator, a suggestion that may be implemented to improve that score and its underlying performance may be included in a comment. Accordingly, the review process 128 or review step 128 provides an opportunity to link scores and comments in order to provide useful feedback.

The correction step 130 is optional. That is, in the correction step 130 a supervisor or administrator may go back to a respondent (evaluator, employer) to discuss any data that appears to represent an outlier with respect to the mainstream data. Similarly, a supervisor or a respondent may be permitted to edit data if errors exist, or if attitudes are changed to be more objective. For example, an individual may express emotion in numbers, thus distorting the values thereof. Upon reflection, an individual may determine that a score was not reflective of long term observations of reality. In certain embodiments, the correction module 130 or correction step 130 may provide for spot checking of individual records to determine whether any particular data point is consistent with comparative data.

A group 132 of steps in the process 90 are executed primarily by the processor, but may provide for intervention by supervisors, managers, administrators, and the like. In certain embodiments, every individual rates every individual in the same group. In yet another embodiment, only supervisors rate individuals. It has been found effective in experimental embodiments of an apparatus and method in accordance with the invention to allow modification of a record only by a person who created the record. Thus, this approach may provide a certain filter limiting the ability of any individual to distort any records.

Ultimately, a reporting step 134 provides an output that becomes part of a permanent record. For example, a report for each individual providing an overall average of performance, an average of each of the nine areas of questioning, a value of a delusion factor, a value of a balance index, a percentile ranking, and the like may be provided in a report step 134. Information from personnel evaluations tends to be highly sensitive information. Accordingly, the reporting step 134 may require a password, protection, written outputs, manager approvals, and the like. Similarly, a report 134 may require an acknowledgment by an individual that that individual has seen the report.

Figure 5:
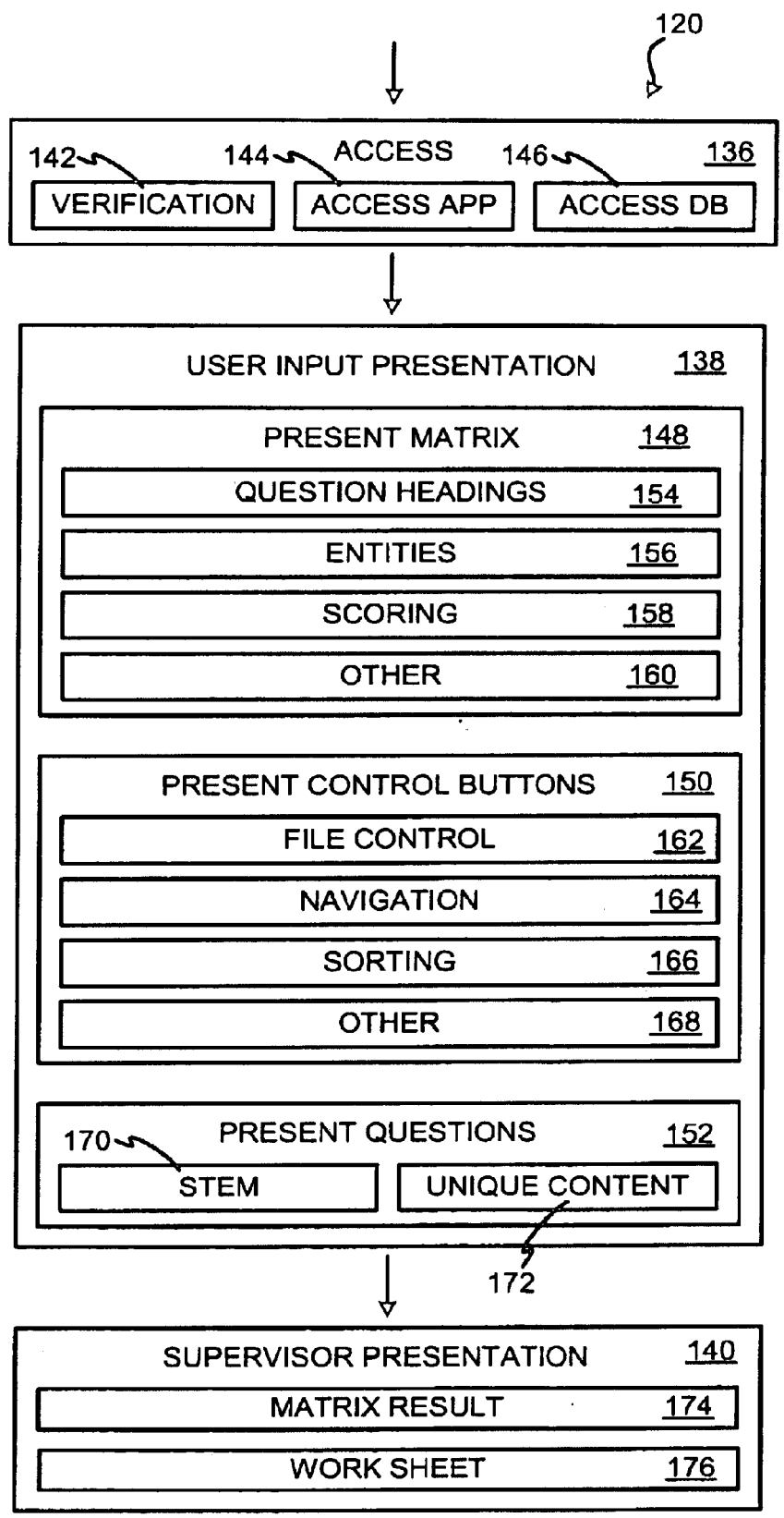
FIG. 5 is a schematic block diagram of details of the computer application for receiving and processing user inputs in one embodiment of a system in accordance with the invention.

Referring to FIG. 5, a process 120 or the execution process 120 of an overall evaluation process 90 may begin with an access step 136. That is, the illustration of FIG. 5 may be viewed as an architecture for specific implementations in software, but also represents an image of a process. Accordingly, an access module 136 may executed to provide an access step 136. Similarly, a user input presentation module 138 may execute a user input presentation 138 in order to present information, instructions, menus, and the like. Thus, the user input presentation module 138 may collect data from individuals.

Ultimately, a supervisor presentation module 140 may present a supervisor presentation 140 in which a supervisor or administrative individual may view, edit, oversee, check, etc. the results of the process 90. In certain embodiments, a verification 142 is required in order to obtain success access to an evaluation process 90.

Similarly, an individual may access 144 an application such as the process 120 through a user interface 70 in order to complete the execution 120. Data being highly valued may require a step to access 146 either a database 92, a database 94, or both. Typically, a user interface 70 may provide to an individual user access to the database 94 relative to an individual survey. Typically, an individual user will not need access to any preexisting master database 92 holding other employee records.

The user input presentation 138 may include presentation 148 of a matrix. That is, the matrix of all individuals against all questions would provide question headings 154 with corresponding identification of entities 156. In general, entities 156 may be people, things, events, projects, organizations, or the like. However, in a personnel evaluation, entities 156 are simply the individual people. Similarly, the presentation matrix 148 or the presenting 148 of the matrix may provide for scoring 158 and other information 160.

Typically, the presentation 138 will include presentation 150 of control buttons. For example, file control 162 in order to manipulate access to information may be hidden or may be evident to a user. In one embodiment, buttons provided to a user provide for access to selected files important to the evaluation process. Similarly, navigation information 164 or navigation buttons 164 may be provided in order to scroll up, down, to previous records, the next records, and the like.

Typically, as part of navigation 164 or separate therefrom, may be a need to organize. Accordingly, a sorting step 166 or a sorting button 166 may be provided in order to allow a user to sort by rank, name, or other easily viewed format. Similarly, a user may have a particular organization that is meaningful. Alphabetical organizations may be useful in certain contexts, but a sorting in a ranked order may actually have more value toward the end of the valuation process. In this way, an individual user may be able to determine whether the sum of the individual evaluations is reaching a result acceptable by the individual responsible for the evaluations. Other buttons 168 may be provided as necessary, convenient, or useful.

Presenting 152 questions to a user may be done in a variety of formats. Nevertheless, in certain experimental embodiments of an apparatus and method in accordance with the invention it has been found that presentation of a stem 170 that does not change allows a person or evaluator to focus on the unique content 172 pertinent to each question. Accordingly, presenting 152 may include presenting a generic stem 170 that can referred to on each question, but may not be, since it is repetitive. On the other hand, the unique content 172 may actually be highlighted, bolded, placed in bright colors, or otherwise highlighted in order to draw attention to it.

Finally, a presentation 140 to a supervisor may include presentation of matrix results 174 including the rankings of all the individuals, and the data in a process, semi-process, or raw configuration. That is, for example, the matrix results 174 may be presented as raw data in which a supervisor may see any individual evaluation sheet of any individual person conducting an evaluation of any other individual or group. By the same token, a supervisor may prefer to see trends, averages, rankings, and the like. Accordingly, the matrix of results 174 may be provided in any suitable fashion.

In one embodiment, a worksheet 176 may be provided to a supervisor. Typically, the matrix 174 constitutes all scores for all individuals. Certain embodiments thereof may show the net score for all individuals. In yet another screen or presentation of the matrix 174, the scores by an individual for each person in an organization may be displayed in a matrix, wherein the scores are displayed approximate the names. In a worksheet or work screen 176, a supervisor may operate to show scores for an individual as ranked by all individuals. Rather than seeing the overall picture of how each person faired with respect to another person, a supervisor may see how all individuals scored a single person, and thus be able to more easily detect outlying data that does not represent accurate information. For example, an individual may have an opinion inconsistent with other opinions. Similarly, a supervisor may find that an individual ranks everyone consistently lower than another person. Some people believe that everyone in the world deserves a maximum rating unless evidence exists to the contrary. Other people believe that all people are basically average in the absence of outside evidence. Yet others have such a negative opinion of human beings that all persons are low in their esteem unless hard evidence exists to raise them out of those depths.

Normally, such variations between attitudes of people will wash when agglomerated. Every person may receive an appropriately low score by the same individual, whereas everybody will receive the same proportionally higher score by another individual. Thus, when all scores are added and averaged, these scores may all reflect an effective normalization of personal prejudices as to scaling. By the same token, other effects may not be so easily normalized. However, one desirable ability of a manager is the ability to determine whether data is invalid by virtue of incorporating emotional or prejudicial effects in assigning numbers. Thus, a work screen 176 or worksheet 176 provided to a supervisor permits side-by-side visual comparisons of data as sliding, ranked points by scale, rather than as numbers that must be interpreted and visualized otherwise.

Figure 6:
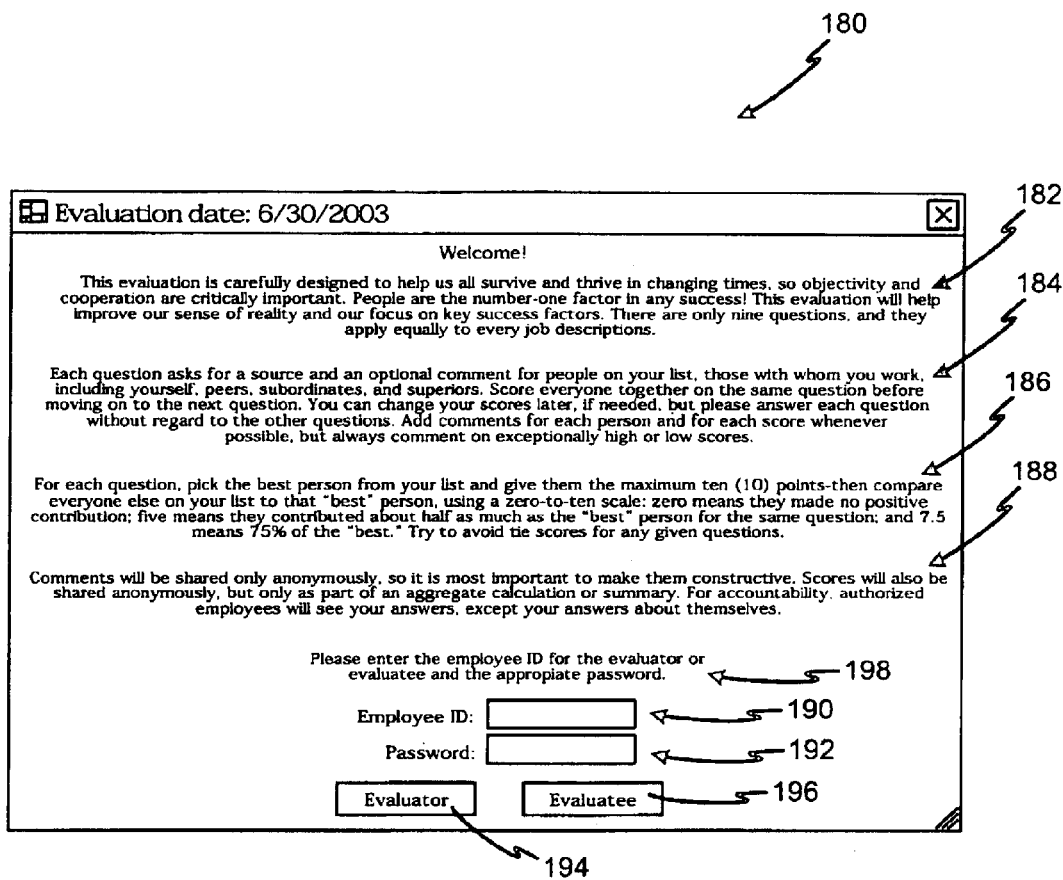
FIG. 6 is a screen shot of one embodiment of the system of FIG. 5.

Referring to FIG. 6, a screen 180 may be presented to an evaluator (user, employee, etc.). In general, in addition to the typical standard navigational aids on a computer screen, the screen 180 may provide text providing motivation 182. That is, thoughtful, meaningful, sincere inputs are most desirable. Accordingly, a certain degree of motivation is deemed appropriate in order to encourage thoughtful and careful consideration by one individual when scoring or ranking or evaluating other individuals. Thus, the motivation 182 contains information selected to motivate dutiful attention to the process 90.

Similarly, background 184 provides information that helps a user understand how the process will operate. For example, understanding what is going to occur, when it will occur, and that an individual can modify responses after they are initially made, as desired, may all be useful information to provide the background 184 necessary to understand the process and have confidence in it.

Ultimately, an individual must receive instructions 186 in order to know what to do specifically. For example, how many points are available, how to award points, what the meaning of points is, how to normalize the scores by selecting an individual as the rating of 10.0 in value due to that person's position as the very best at a particular trait. Likewise, the scoring system for the process 90 has purposely been selected to provide at least 100 increments of gradation. Accordingly, a 10.0 score represents one hundred percent of the available points. By the same token, 0.1 represents the minimum increment. A score of zero meaning that this individual made no positive contribution. In certain embodiments, scoring also provides for an entry of "not applicable" meaning that an individual is without legitimate information necessary to provide any rating. Thus, an individual may recuse himself or herself from providing a ranking that might be uninformed, and thus distort the correct results.

Confidentiality being what it is and anonymity being necessary for candor in certain situations, assurances 188 may be necessary. In certain situations, assurances 188 provide additional motivation 182. For example, understanding who will see the data, how it will be viewed, and the like may be included in assurances 188.

Typically, an employee identification 190 identifies the evaluator. Most employers have some type of universal identification. In a computer system, a number is often assigned. In order to preserve anonymity, a coded number may be provided. By whatever means, some universal and unique identifier 190 is required for access.

A password 192 may be required, and is typically appropriate in handling sensitive information. Similarly, buttons 194, 196 may provide additional keys to access. That is, for example, as an evaluator, an individual may use the evaluator button 194 to indicate this status. Therefore, the password 192, in addition to the evaluator identification will provide access to certain records available to the persons so identified 190 in their capacity. By the same token, as an evaluatee, an individual will be permitted by virtue of the password 192 to see a different set of records.

Figure 7:
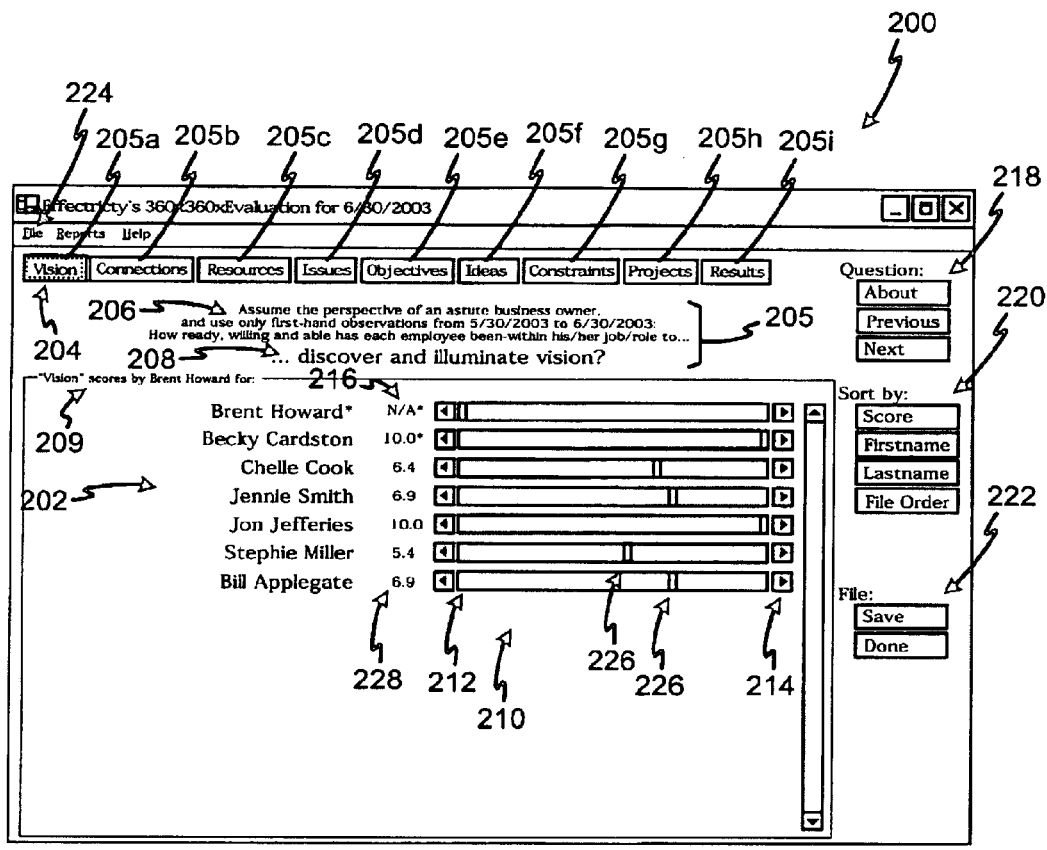
FIG. 7 is a screen shot from the embodiment of FIG. 5.

Referring to FIG. 7, a screen 200 is a work screen worksheet for inputs by a respondent (reviewer). In the illustrated embodiment, the screen 200 provides a list 202 of names. The list 202 or the names 202 identify everybody in a particular organization that is to be evaluated by the respondent viewing the screen 200. Keywords 204 that may be thought of as headings 204 correspond to each question. Each heading 204 corresponds to a question. Accordingly, a button 205 is provided to correspond to each heading. Each of the buttons 205a–205i (the trailing letter indicates a particular instance of the item identified by the leading identification number) allows a user to select that particular question. When the question is selected corresponding to a heading 204, then the stem 206 is augmented by an appropriate content 208.

Typically, the series of presumptions or the context in which a question is to be asked may be identified in a single stem 206. In the illustrated embodiment, a user is asked to assume the perspective of an astute business owner. Moreover, the observations must be first-hand with the reporter (reviewer, user, etc.). Typically, a major source of distortion in employee evaluations is the tendency of individual reviewers to carry forward prejudices from the past. Moreover, second-hand stories tend to be placed into the bin for equal billing with actual personal observations. Moreover, people tend to look globally, rather than at a specific period of time.

Accordingly, in the illustrated embodiment, the time period is selected to cover only a particular range. This range may correspond to a quarter, month, year, or other evaluation period. Likewise, an integration clause requests a reviewer to identify a readiness, willingness, and ability to perform the designated content corresponding to a question. Moreover, the stem 206 circumscribes the scope of the evaluation to lie within the job responsibilities of the person being evaluated. Thus, the custodian and the president will each be given the benefit of the scope of their employment rather than the universe of all employment within a company or within the universe of all persons or within the universe of all time.

The content 208 may be explained further. However, the terminology has been selected such that its meaning, although very precisely defined, is adequately expressed in the generic expression of the terms therein. Accordingly, two verbs, indicating the ability to collect and gather and the ability to transmit to others a particular aspect of work are included in the question content 208.

A prompt 209 identifies exactly who is evaluating and what is being evaluated. That is, for example, a supervisor's prompt 208 may state that the scores are those for a particular question and a particular person, as rated by a series of persons. By contrast, the screen 200 of an individual reviewer may be identified in the prompt 209 otherwise. For example, in the illustrated embodiment of FIG. 7, the question is identified, and the scores are clearly those for a list of persons being evaluated, as done by the identified employee reviewer. One may note that the screen 200 may be presented to supervisor for evaluating employees in the list 202. Alternatively, the screen 200 may be used by an individual employee for evaluating every other employee in a particular group with which both are associated.

A scale 210 appears for each person and each question. The scale provides a visual ability by a user to select any ranking between a minimum value 212 and a maximum value 214 intuitively. That is, numbers tend to be the artifact of analysis and recording. People live, see, and think in pictures. That is, people experience the real world and relate to concepts of more and less. People relate to concepts of greater and lessor, better and worse, etc. Accordingly, the scale 210 provides an ability to place markers 226 corresponding to each of the names 202. The user may see on the screen 200 a numerical ranking 228 or a numerical score 228 corresponding to the position of a marker 226. Nevertheless, a user may rely on a intuitive feel for scoring.

Users may select an abstention 216 indicating that not enough information is available to support an evaluation. Accordingly, rather than giving a distorting score, an individual user may simply indicate that the question is not applicable. In one currently implemented embodiment of an apparatus and method in accordance with the invention, drawing the marker 226 all the way to the left extreme 212, will pass zero, and provide one last element or position that provides the abstention marker 216 or abstention indicator 216 indicating that no evaluation is made.

For the sake of navigation, question buttons 218 may allow a user to navigate to a previous question, a next question, or to move to another question. A user may pick a topic, or simply go to the previous or next topic in sequence. Similarly, sorting buttons 220 may provide sorting by score, first name, last name, a file order, or some other criterion available. Accordingly, a user may provide for himself or herself a more intuitive feel for the scale 210. For example, if a series of names 202 is arranged in an order according to score 228, then the markers 226 will display in a monotonic cascade going from right to left or from left to right across the scale 210. Thus, an individual may perform a check as to whether or not the rankings exhibited by the ordering of the list 202 of names 202 is correct.

Similarly, seeing two items side-by-side, the names 202 of individuals, with their scores 228 may cause or provide motivation to adjust scores 228 accordingly. That is, many tasks in this world are too complex for an individual to grasp or execute. However, a comparison between two items based on any criterion is typically considerably easier. Accordingly, any two names 202 may be compared, and any two scores 228 may be visually compared quite simply on the scale 210 without difficulty.

Additional file management buttons may be provided, such as the file buttons 222 and the conventional tool bar available with various operating systems and applications. Accordingly, a user may indicate when the evaluation is completed, and may determine to save the data as the final results of an evaluation process.

Similarly, a supervisor may be presented the screen 200 with somewhat different prompts 209, in order to determine the scores 228 for an individual, based on a list 202 of names of evaluators. Thus, checking for prejudice, errors, and other outliers is visual, instant, and reliable.

Figure 8:
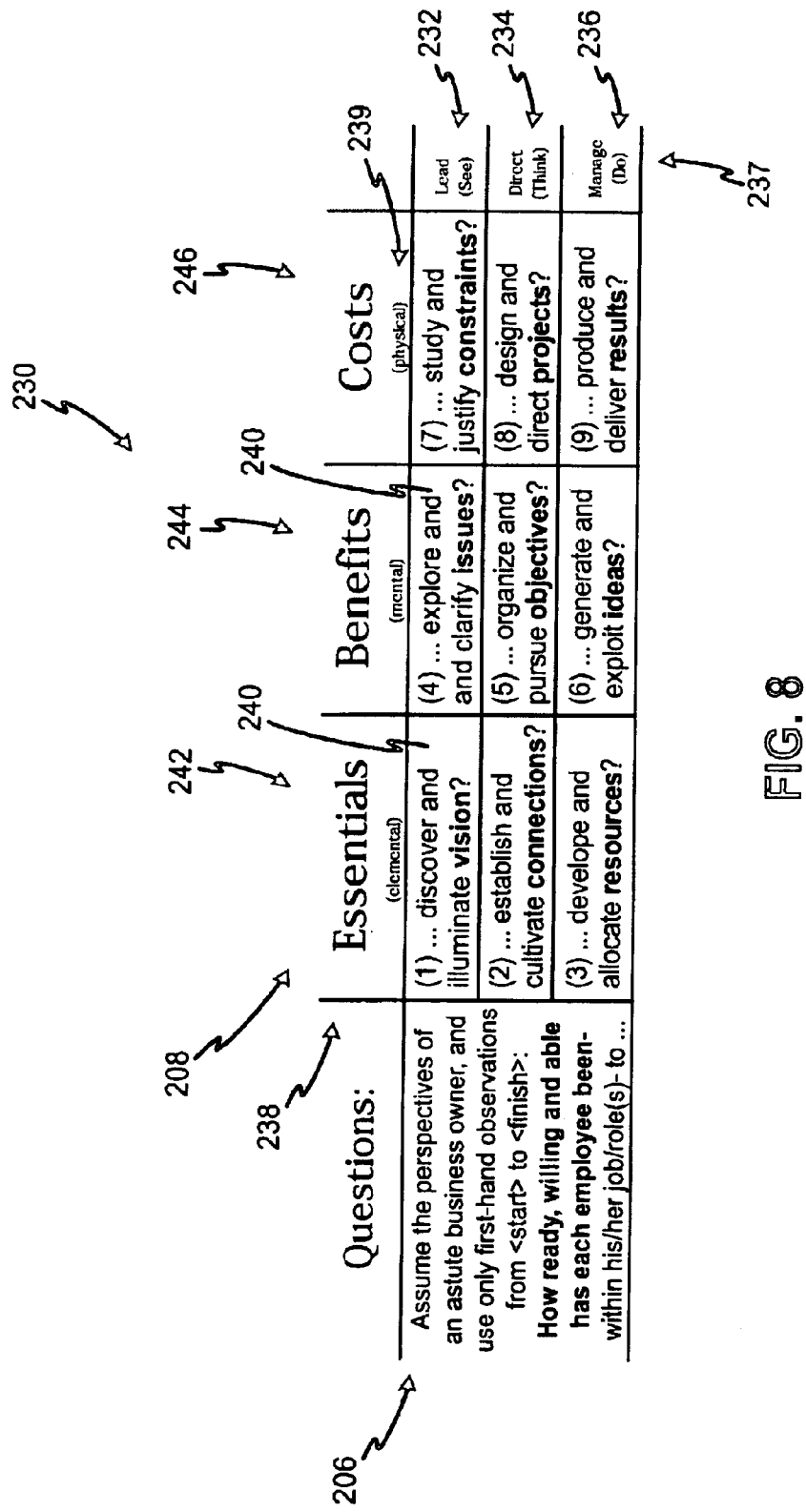
FIG. 8 is a table illuminating the content of one embodiment of the system of FIG. 5.

Referring to FIG. 8, a chart 230 or matrix 230 shows the recursive nature of the process underlying the evaluation system 90. In fact, the matrix 230 indicates how a process may be developed for a generic task. Various individuals promote various approaches to human relations, engineering, manufacturing, marketing, selling, communication, programming, and the like. Almost every process known to mankind has proponents of various approaches to that process.

However, in an embodiment of a method and apparatus in accordance with the invention, nine questions may be converted into nine areas of attention or activity. These nine areas are found to be simply a recursion of a basic unit having three concepts. Thus, this unit of three concepts recurses three times to form a column, which recurses to form a matrix 230 of nine elements 240.

In the system 60 and the process 90 for implementing that system 60, the question stem 206 was a leader or lead-in to a series of questions 208 that can each be represented here in a matrix 230 of rows 232, 234, 236 and columns 242, 244, 246. Each of these rows may be characterized by a characterization 237 and each column 242, 244, 246 may be characterized by a particular characterization 238. Alternative characterizations 239 are shown in parentheses.

In general, each element 240 represents a step 240 in a process. In the evaluation process, nine basic questions 208 are posed on the basis of which to evaluate any individual. However, those questions are related directly to a universal, recursive, generalized system for accomplishing any task. Thus, in an apparatus and method in accordance with the invention, a process for directing, communicating, evaluating, and advancing a process, product, or any other result is provided.

Accordingly, it makes sense to evaluate individuals based upon their contribution to the nine elements 240 or steps 240 that contribute to the ongoing enterprise. Each of the elements 240 is unique, and yet each of the elements 240 recurses. Similarly, the scope of stewardship of any individual may include the entire matrix 230. However, individual organizations may each be assigned a predominant role principally related to any one of the elements 240. Thus, the concepts of vision, connections, resources, issues, objectives, ideas, constraints, projects, and results may be viewed as the underlying elements 240 of an enterprise providing some type of output to its customers.

By the same token, any organization, person, or other entity within the enterprise may also have the same matrix 230 of endeavors within its own stewardship or scope of responsibility. Similarly, any organizational element may find that itself has a role as the major actor in an element 240 as viewed from the enterprise level of stewardship.

Likewise, any individual human being may find that recursing into a matrix 230 of elements 240, including all nine elements 240, may provide an ability to handle degrees of complexity, reduce blind siding, fill in blind spots, and provide for a complete view of one's individual responsibilities. Thus, each of the elements 240 contains the main activities that constitute each row 232, 234, 236 and each column 242, 244, 246, of the matrix 230.

Thus, the tasks of an individual recurse in the embodiment of the system of FIGS. 2–7, each of the elements 240 provides the content 208 for a question 208. The stem 206 provides the boundaries in which the active element 240 is to be evaluated. Nevertheless, each of the elements 240 represents a function, task, responsibility, or the like that must be accomplished by an enterprise in meeting is objectives, by an organization in meeting its responsibilities, individual, and so forth.

Figure 9:
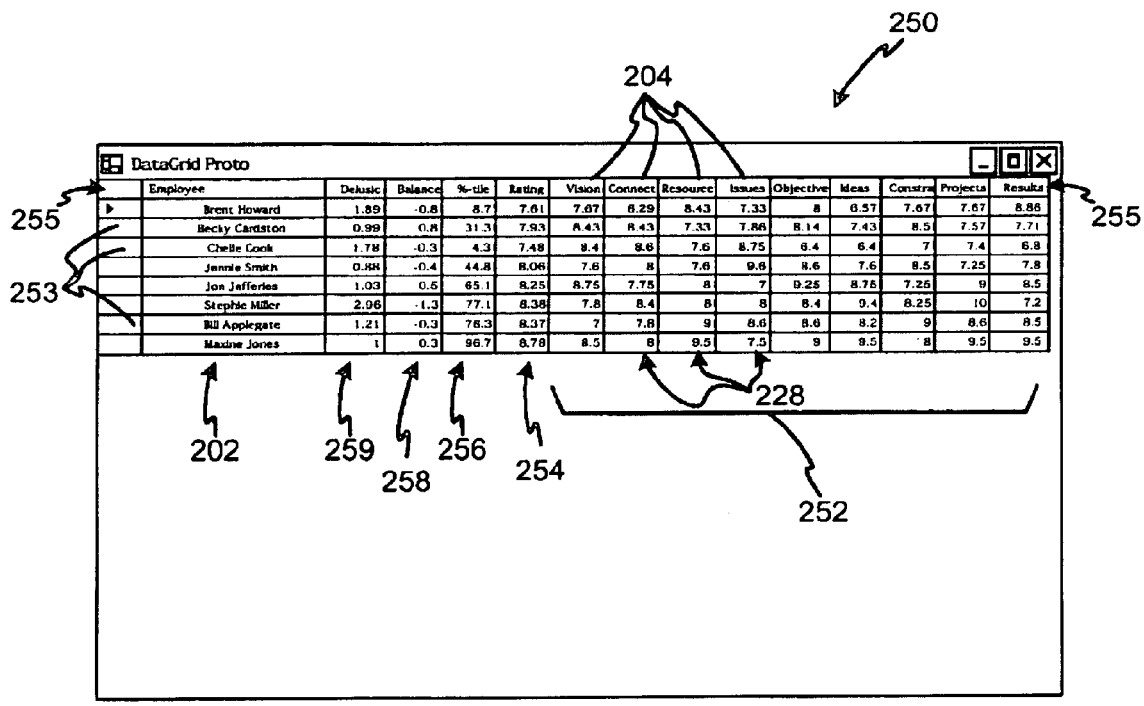
FIG. 9 is a screen shot of a summary work screen associated with the embodiment of FIG. 5.

Referring to FIG. 9, a screen 250 or work screen 250 presented to a supervisor or administrator, displays an array 252 of scores 228. The scores 228 are aligned with individual names 202 as individual records 253. Each record 253 provides a score 228 or a particular name 202 under each of the headings 204 corresponding to the questions 205.

Each question 205 is comprised of a stem 206 and a content 208. The content 208 is further abbreviated to form a heading 204 indicating the core content of the question 205. Likewise, a list of the rating 254 aggregated from all individual scores 228 displays in the record 253 for each name 202. A percentile ranking 256 provides a different breakdown of evaluation. The balance index 258 and the delusion factor 259 discussed hereinabove also display for each name 202.

Accordingly, based on the screen 250, a supervisor may detect anomalies within individual records in order to identify outliers in the data and outliers in the actual performance of individuals. In reviewing, for example, the percentile rankings 256, one notes that most values lie within a broad central region between 31.3 percent and 77.1 percent.

On the other hand, two outliers are particularly low, having values of 4.3 and 8.7 percent. Accordingly, in one embodiment of an apparatus and method in accordance with the invention, these outliers are highlighted for particular attention. These outliers indicate a very low percentile ranking, approaching zero percentile, and certainly under the tenth percentile. People associated with these outliers, if the data are accurate, may need particular attention, may be mismatched to their job responsibilities, or may have other reasons that put them out of the general performance of others in the organization.

Likewise, the entry of 96.7 percent indicates an outlier performing far above the rest of the organization. Almost nineteen percentage points separate the highest percentile ranking from the next closest ranking 256. Highlighting these outliers provides an incentive to management to notice and reward or assist the persons who fall outside a broad central region of performance or expectation.

In the illustrated embodiment, the records 253 are ordered (sorted) by a file number or some identification number associated with each of the names 202. However, in one presently implemented embodiment, selection of any heading 255 provides sorting based on that particular heading, and the values associated therewith for all records 253. In certain embodiments, a single click ranks in descending order according to the values corresponding to a particular heading 255.

In other alternative embodiments, a second click (that is two clicks in rapid succession) may change the order. In one presently implemented embodiment, every click or selection of a heading 255 directs the system 60 (e.g. process 90) to order according to the selected heading 255, in the opposite of the last order selected. That is, a selection toggles between ascending and descending order, and selection selects a particular heading 255 by which to order. In this way, a supervisor or other administrator may selectively order records 253 to show the greatest and the least delusion factors, balance indices, percentile rankings, ratings, or other individual scores 228.

The scores 228 may be normalized in a number of different ways. In fact, many different normalization techniques may be used simultaneously in order to provide more robust results. For example, for every question, every respondent (evaluator) selects the person in a group who is most competent in that area as the baseline value of 10.0. Accordingly, each person has effectively been forced to normalize the scale to a scale of ten, and to individuals only within the organization.

When groups are compared, the highest ranking individual in a particular category may be designated to have a value of ten, or may simply be left at the value that has been averaged over all evaluations. When a supervisor who has stewardship over multiple groups reviews data, the highest rated person, in each particular category, may be normalized between the groups. That is, someone in a position of authority and knowledge to know and to decide may determine a relative ranking between two highest ranking individuals into disparate groups.

The scores may actually be altered in recognition of the fact that the highest score in one group corresponds to an individual who is functioning better than the highest scorer in another group, who may have a higher absolute score. Accordingly, the scores may be normalized.

In the same manner, minimum scores may also be normalized. One in the position of authority and knowledge with the right and ability to decide, may compare lowest performers and normalize them with respect to one another. In one embodiment of an apparatus and system in accordance with the invention, the process 90 and system 60 automatically adjust all scores to scale them between extrema so normalized.

In certain embodiments, the same process may be undertaken for averages. In such an event, the averages may be normalized between individuals. Similarly, averages may be normalized between simple average values, with persons representative either below or above the average value. In such an instance, a better normalization is provided in normalizing the lower half of a group, against the lower half of another group, and the upper half of the first group against the upper half of the second group. That is, the scale from the average to the maximum is mapped and the scale from the lowest to the average is mapped, each independently from the other.

Effectively, normalization alters the scale 210. However, in one presently contemplated embodiment of an apparatus and method in accordance with the invention, only the person creating a score is allowed to directly edit that score. For example, if an employee has given a score, and a manager believes that the score is motivated by spite, complicity, or some other motivation, then an employee may be encouraged to rethink their evaluation.

Similarly, if managers conduct evaluations of their employees, then only the manager responsible for a score of an individual within the purview of that manager is allowed to change the score for that individual. However, in making such a change, either upward or downward, that manager or supervisor is necessarily visible to both his or her supervisor, as well as the other peer's supervisors. Thus, justification of scoring against the normalized scale is encouraged.

Figure 10:
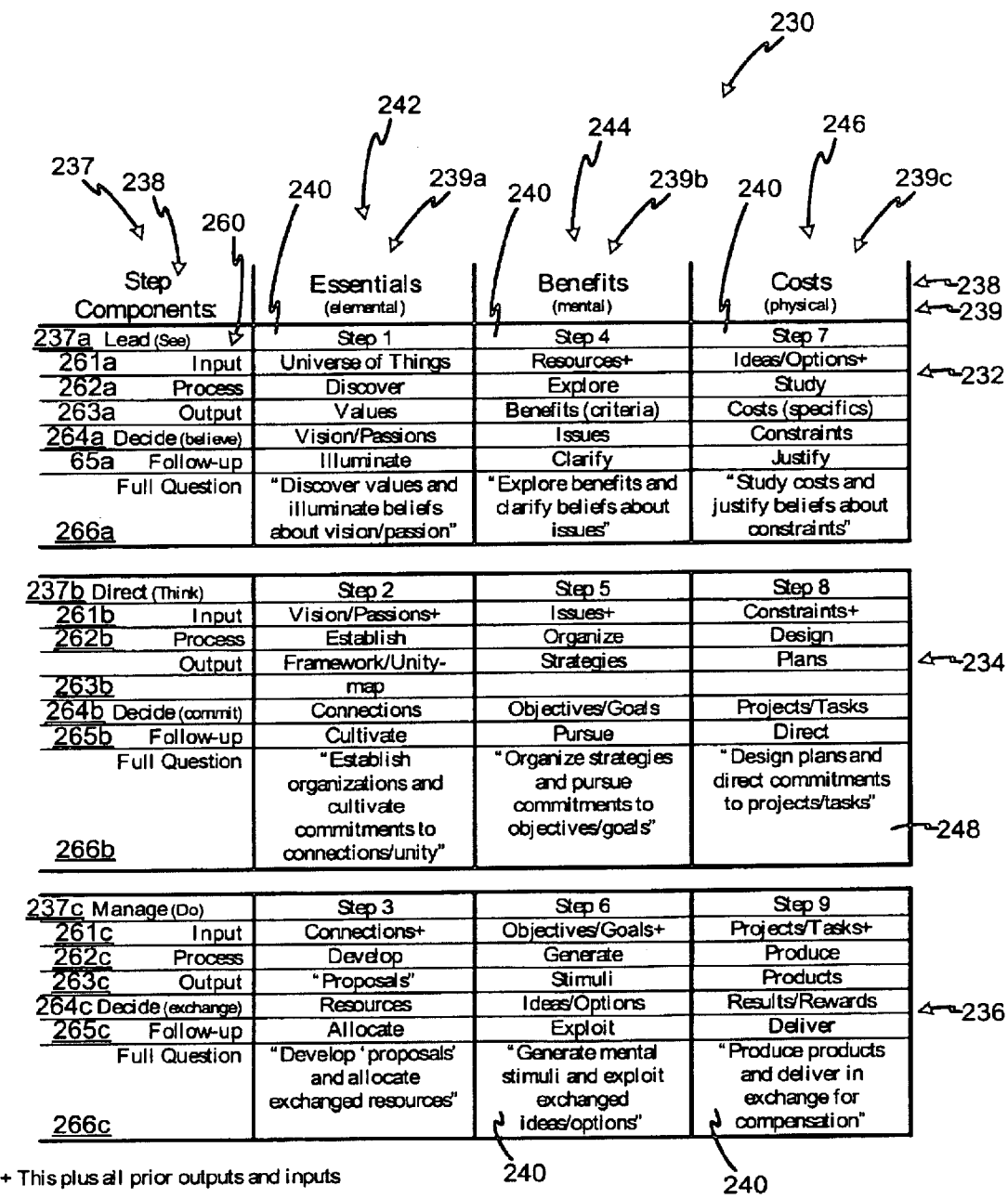
FIG. 10 is a tabular matrix of elements constituting inputs, outputs, processes, and results from a processing in accordance with the invention.

Referring to FIG. 10, the matrix 230 of elements 240 or steps 240 may be represented by certain characterizations 238. Specifically, characterizations 237 may be applied to individual rows 232, 234, 236. Other characterizations 239, which may include the same factors as the characterizations 237, may be used to represent the tasks, or dealings of any particular activities associated with a column 242, 244, 246.

It is important to remember that within any individual step 240 or element 240, the entire process 260 is included. Moreover, within any process 260, recursion may occur. Thus, the activities of an individual element 240 may recurse to expand to single element 240, creating a column 242. The columns 242 may recurse to form other columns 244, 246. Thus, a single element 240 contains all of the characteristic activities associated with an entire column 242. An element 240 contains within itself the components 260 corresponding to the characterizations 237 of the individual rows of 232, 234, 236, of a column 242, 244, 246.

Referring to FIGS. 10–11, within any given element 240, one responsible for the output of that element 240 must sense facts, link facts, and evaluate those facts. One may regard these processes of sensing, linking, and evaluating in order to come to a decision, as the equivalence, in human terms, of seeing, thinking, and doing.

In the abstract, "seeing" is characterized by the process of observing visually or otherwise, even perhaps collecting observations over time. Similarly, "thinking" may be characterized as the process of mulling over the content that has been seen, observed, collected, and so forth in order to begin formulating structures. Typically, structures seem to present themselves when not otherwise explicitly given. The human mind is extremely capable of ordering and structuring information that it receives. Accordingly, thinking may be considered the human equivalent of linking facts together in order to give them a reliable or repeatable or useful structural relationship with one another.

"Doing" is best characterized by the physical activity or process of taking some affirmative action based on what one has seen and thought. Accordingly, doing includes within it the process of evaluating information or the summation of thinking and seeing and processing that information into a course of action, deciding on that course of action, and affirmatively advancing that course of action.

Thus, the generalized processes or activities for any entity, whether it be an abstract organization, a machine, or a human being is sensing facts, linking facts, and evaluating facts. The equivalent for human beings is seeing, thinking, and doing.

Many times people discuss the concept of a computer thinking, or seeing, but this is merely an anthropomorphism into human terms of the generic tasks or processes of sensing, linking, and evaluating. Thus, the human term "do" in the immediate context or in the immediate implications may be thought of as the act of processing information, evaluating, and so forth, typically for the purpose of executing a decision and moving forward.

Thus, doing constitutes processing so that a decision may be made whether or not to progress to the next step. To the extent that information and thinking are more abstract, then doing may be more abstract. To the extent that processes move forward toward actual realization in physical embodiments, then doing becomes more concrete and physical, while seeing and thinking corresponding to those "doings" likewise become more oriented toward the physical.

In FIG. 11, one may see the first row as representing activities of seeing, thinking, and doing. The second row may be thought of as the objects to which such activities are directed. For example, content 267a is raw information. Content 267a may be seen. Data may represent content 267a. However, since seeing 238a and sensing 269a are effective equivalents, then the content 267a may be data or any other information that can be sensed, detected, perceived, or the like.

Likewise, just as linking 269b and thinking 238b are similar, context 267b is the object of such thinking 238b and linking 269b. Thus context 267b provides meaning to raw data such as content 267a. Context 267b may be thought of as the domain in which data exists and by which it becomes information rather than raw data.

For example, "1040," if spoken, may have several meanings. In the context of a clock, it represents a time of day. In the context of taxes, it represents a standard IRS form. In the context of a calendar, it represents a year during the dark ages. In the context of an address, it typically will represent a street location. Thus, the digits "1040" represent data, but the context gives meaning.

Many times during communications between human beings, context is implied. Oftentimes, context is very well defined by the environment, the individuals, the time of day, the location, or some other characteristics. Accordingly, people often presume context. However, in a computer world, context must typically be provided or numbers are meaningless. A computer may process numbers without context. However, the context must be restored in order to provide meaning to a human being making a decision.

Accordingly, a process 267c is analogous to doing 238c or evaluating 269c. Processing 267c is conducting an evaluation of content 267a in the proper context 267b, in anticipation of making a decision.

Carrying the analogy forward, or the mapping forward, the prospect of seeing 238a or sensing 269a is largely focused on elemental factors 239a. For example, the universe of facts that can be sensed by a person or a device may represent all of the elemental occurrences and evidences that surround one in an environment, and are capable of being detected. To the extent that an article can be detected, it might possibly be considered for further observation, evaluation, use, and so forth.

Thus, upon detection of an elemental factor 239a or an elemental structure 239a, mental activities 239b may be appropriately exercised. As with context 267b, mental processes 239b or mental activities 239b begin to structure, organize, and otherwise provide interpretation and context for observed elemental factors 239a. Interpretation, perspective, experience, and the like may all result from mental processes or mental activities 239b operating on elemental factors or observations 239a. Likewise, the actual doing 238c with the elemental factors 239a observed in one's environment may typically result in physical activities 239c in anticipation of producing a result.

Interestingly, elemental factors 239a seem to exist like axiomatic facts, materials, and other realities. Likewise interestingly, benefits are almost always of a mental nature 239b. That is, peace of mind, comfort, and the like are often merely mental abstractions or a mental condition. Many benefits are only such because of a perceived mental value. The fashion world is famous for creating a need for a particular benefit, then selling millions of dollars worth of that perceived benefit. Few argue that the entire benefit is often only a mental interpretation by a buyer of the value or beauty of a particular fashion statement.

Also interestingly, costs are typically physical parameters 239c. That is, in order to provide a perceived mental benefit 239b, one must expend physical resources 239c. For example, one must spend time, of which everyone has the same limited amount. One must devote other physical resources, whether gathered, discovered, or created in order to apply to achieving the mental benefit 239b. Energy, a major factor in many industrial decisions over the past three decades is a physical quantity that can be captured, harvested, generated, and the like in order to produce some output. That output is typically directed toward providing some benefit that is effectively a mental benefit 239b.

In organizations, roles are often defined for individuals and organizations. Typically, leading 237a corresponds to seeing. A captain on the conning tower of ship or submarine is seeing ahead. Similarly, leaders are typically considered to be the visionaries responsible for seeing the direction that one is going and that one should go.

Similarly, and analogously, directing 237b may be thought of, and is used herein to identify, that effort that gives meaning. Context 267b, the mental exercise 239b, and the like are required to advance observations of fact (leading 237a) forward into the process of doing 238c, processing 267c, the physical realm 239c, and the like. Accordingly, managing 237c corresponds to doing 238c or otherwise operating in the physical parameters 239c responsible for evaluating 269c and the like.

Within an individual element 240, seeing 238a, thinking 238b, and doing 238c are often characterized best by the prospect or the activity of surveying 268a, organizing 268b, and proposing 268c, respectively. That is, surveying 268a may be thought of seeing 238a or of sensing facts 269a. Similarly, organizing 268b is the process of linking facts 269b, or exercising the mental parameters 239b in order to advance beyond that which is seen 238a or sensed 269a.

Carrying the analogy or synonyms further, creating proposals 268c amounts to presenting something for a decision that once decided, can be input into the next stage of any process or processing. Thus, the characterizations 238 are generic and analogous in nature if not to equivalents. That is, the first column of FIG. 11 corresponds to the sensing analogs. The middle column corresponds to the mental and meaning analogs, and the third column corresponds to the doing, processing, or evaluating that corresponds to the physical parameters 239c that must be accommodated.

The principles involved herein are necessarily limited in their exposition by the limitations of language. Seeing 238a, content 267a, surveying 268a, leading 237a, and sensing 269a, and elemental factors 239a are related and analogous. They correspond roughly, and respectively, to activities, objects of the activities, tasks, roles, generic acts, and the domain, in which they pertain. By the same token, the same correspondence exists for thinking 238b, context 267b, organizing 268b, directing 237b, linking 269b, and mental factors or activities 239b.

Analogous, related, but not actually synonymous, are doing 238c, processing 267c, proposing 268c, managing 237c, evaluating 269c, and the physical parameters or physical factors 239c. These correspond likewise and respectively to human activities, objects of activities, tasks, roles, generic entities, and the domain of operation. Thus, these various terms may be used in place of one another in various environments or situations. Nevertheless, the limitations of language do not necessarily make such substitutions automatic, complete, or accurate in every instance.

Language was more-or-less rigidly defined long before the processes, apparatus, systems, and methods of the present invention. It is nevertheless required in order to express and describe the apparatus and methods of the invention. A certain amount of mismatching or limitation may be introduced by the language. However, herein are used multiple words that relate to various and analogous aspects of ideas and things that are themselves related to one another. This use can help one to understand the commonalities between various elements 240 of an apparatus and method in accordance with the invention.

Each element 240 embodies a series of components 260. Those components involve an input 261, process 262, output 263, decision 264, and followup 265. In the context of the system 60 and process 90 of an evaluation system, a full question 266 is stated. However, each of the components 260 and the full question 266 apply to all processes or steps in controlling product development, software development, chemical processes, organizational management, manufacturing processes, and the like.

In step one, or the element 240 of step one, an input 261a constituted by the universe of things is processed 262a in order to discover an output 263a constituted by values. A value is a positive or negative worth assigned to a thing, event, or the like. Once values have been discovered, then one must decide 264a whether or not to believe in those values. Accordingly, once one has decided 264a to believe in values, then those values are embodied in the details of a vision, passions, or both representative thereof.

What is decided 264a (e.g. vision, passions, etc.) often constitutes the details of the output 263a (e.g. values). Thus, the full or expanded question 266a may be thought of as the charge to "discover values and illuminate beliefs about vision and passion to others."

One may note that discovery results in, and thus the processing 262a operates on, its input 261a in order to output 263a the values. Meanwhile, a decision is made to adopt the values, and the details thereof constitute the vision, passions, etc. Later, an individual, as a consequence of the decision 264a follows up 265a by illuminating to others the vision and passions that embody the values.

In step two, vision and passions as an input 261b are operated on 262b to establish for those inputs a framework, organization, or the like as an output 263b. A decision 264b is a commitment 264b to the connections, and unity that will embody the framework, or organization output 263b. Accordingly, to follow up 265b, one must cultivate the connections and unity that will bring about and constitute the output 263b proposed as a framework, organization, or the like for the vision.

In step three, the input 261c, is constituted by connections, unity, and the like from step two. Input 261, in general, is meaningful information and everything received from a previous step 240. Accordingly, each input 261 includes both content and context. Thus, inputs 261 are meaningful information and materials. The process 262c develops an output 263c constituted by proposals.

A decision 264c in the instance of step three, step six, and step nine, is not unilateral. That is, an individual may make the decisions 264 of steps one, two, four, five, seven, and eight unilaterally in the situation where one has a stewardship over the entire matrix 230. However, steps three, six, and nine typically require a negotiation with a receiver who will receive the benefit of the step 240.

One typically must negotiate or exchange in the decision 264c, since that decision 264c is a bilateral decision. One effectively negotiates or exchanges for resources, ideas and options, and results and rewards, for the steps three, six, and nine, respectively. The follow up 265c for step three involves the allocation of resources that have been negotiated. One approaches a negotiation with certain resources in hand, and negotiates for the resources required to move forward.

Similar to the column 242, the column 244 is constituted by several elements 240 or steps 240. Step four inputs resources, including all previous inputs and information. Some of the information included may include facts that have been interpreted with an attitude and are thus defined as problems and opportunities. However, problems and opportunities are simply facts viewed with an attitude. Thus, one can explore in the process 262a, to output 263a the benefits and criteria. A decision 264 constitutes a decision to believe in the issues as constituted, and a commitment to follow up 265a by clarifying to those who need know exactly what those issues are.

Step five includes inputting 261b the issues from step four, organizing in the process 262b, the strategies 263b in preparation for a decision 264b to commit to the objectives and goals constituting the strategy. Once a decision 264b has been made, one may follow up 265b by pursuing the objectives and goals decided 264b. No issue can be committed to without placing it in a larger context and giving it a priority therein.

Step six takes an input 261c of objectives and goals to process 262c by generating an output 263c constituting stimuli. The stimuli output 263c will result in ideas and options, if the decision 264c to exchange is made. That is, one must negotiate with one's own intellect, and with others in order to obtain their ideas, their intellectual property, their inventions, and their solutions. Thus, with the proper stimuli 263c, one may obtain and exchange 264c or decision 264c to exchange ideas and options in order that one may follow up 265c by exploiting those ideas and options.

In step seven, the ideas and options are input 261a in order to study in the process 262a the costs that will be output 263a as the specifics to be dealt with. Thus, a decision 264a to adopt and believe in the constraints constituting the costs is made. One may then follow up 265a to justify those constraints and costs to those who must implement the results of step seven.

Step eight receives constraints as an input 261b and then proceeds to process 262b by designing a series of plans as the output 263b. The plans constitute a series of details implemented or embodied in projects and tasks that will be decided 264b (committed to). Upon a decision 264b, the projects and tasks may be followed up 265b by direction of a team to implement the projects and tasks.

Step nine receives projects and tasks as inputs 261c used to produce in a process 262c an output 263c that yields products. Products must however be exchanged 264c, requiring a bilateral decision 264c in order to obtain the results and compensation thereof. After the decision 264c, one can follow up 265c by delivering, as negotiated, the products.

In certain embodiments, the steps one through nine may be operating simultaneously. However, the steps 240 one through nine should begin in sequence, and complete in sequence. Communication up and down through the steps typically does not wait for completion of any step. Good communication provides for rapid dissemination of information upward and downward in the ordering scheme of the steps 240.

Within any given element 240, or any step 240 one through nine, an individual, an entity, or an organization may recurse down through multiple layers of seeing, thinking, doing (sensing, linking, evaluating).

An entity may recurse through the three activities, or through the full matrix of nine elements 240. That is, each column is an extension of the three activities. Likewise, each element 240 may be expanded to an additional column. Thus, the entire matrix 230 may recurse through multiple layers of stewardship, up and down. Meanwhile, the matrix 230 itself represents a recursion of the three basic elements (sensing, linking, evaluating) within each element 240, replicated or recursed to create a column, and recursed to create three columns, each column, corresponding to one of the rows in the initial column. Thus, the matrix 230 constitutes three recursions of the components 260.

Inputting 261a includes both content and context, and therefore constitutes sensing 269a and linking 269b, or seeing 238a and thinking 238b. The process 262a constitutes evaluating 269c or doing 238c. One may think of the boundaries between elements 240 as constituting decisions to move forward. That is, one does not pass over a boundary between elements 240 without having made a decision 264. Having made a decision 264, one has exercised then the belief, commitment, or exchange required to follow up 265 and advance the overall process.

Figure 12:
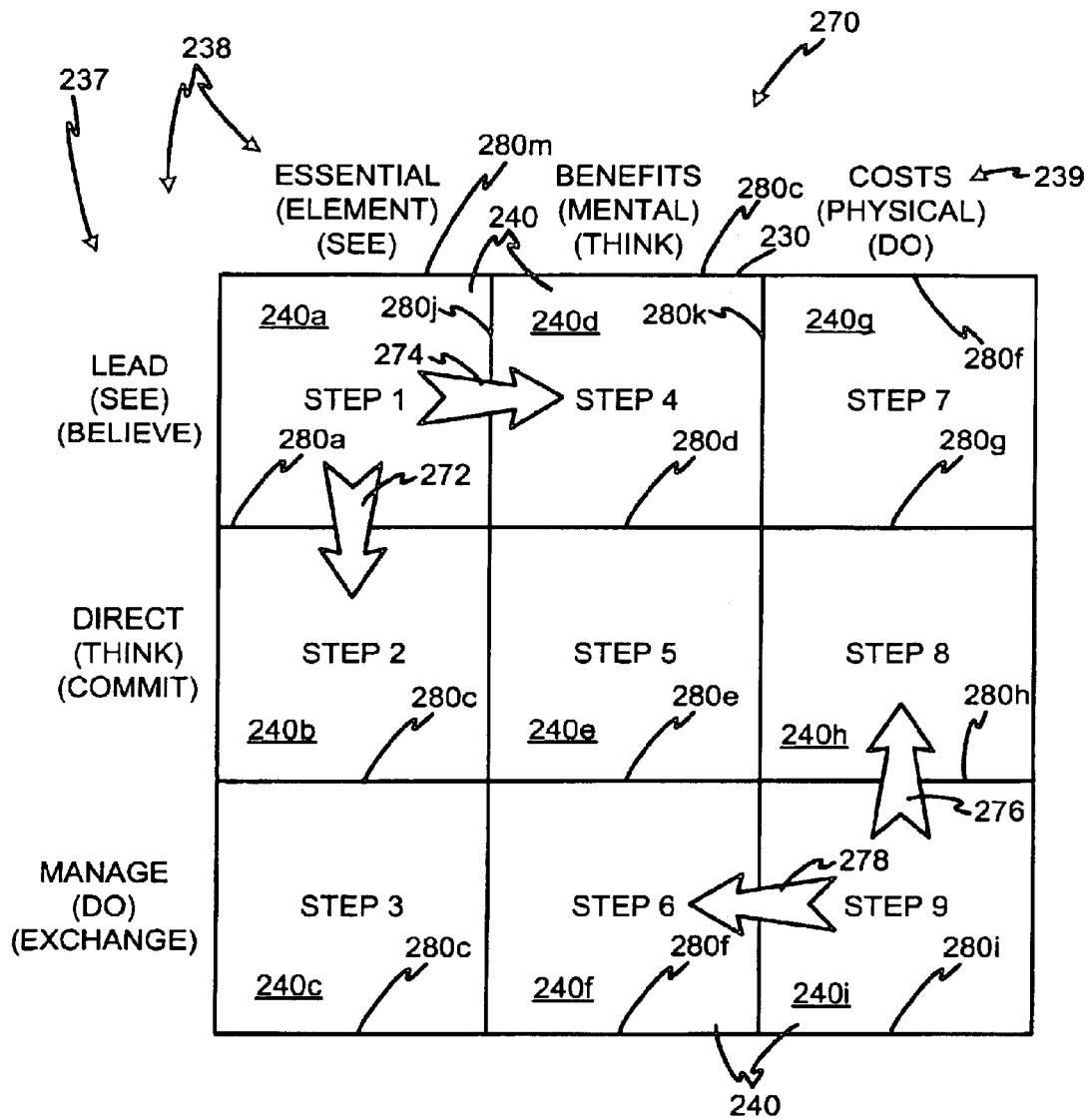
FIG. 12 is a chart illustrating the proximity of relationships between processes and information, as well as activities, in the chart of FIG. 10.

Referring to FIG. 12, the chart 270 represents the matrix 230 with certain notations to provide additional insights. The characterizations 237, 239 applied to rows 232, 234, 236 and columns 242, 244, 246, respectively, may all be considered as characterizations 238 corresponding to various elements 240. This illustration exemplifies relationships that can explain a certain amount the classical dynamics of organizations, relationships, and functions.

For example, the steps one through nine as embodiments of various elements 240, correspond respectively to the vision, connections, resources, issues, objectives, ideas, constraints, projects, and results of the matrix 230. Accordingly, step one corresponds to vision, step five corresponds to objectives and strategy, and step nine corresponds to results, often characterized as "mission." An organization, individual, or other entity responsible for step one has a double interest in the seeing activity or element.

Likewise, the person, individual, entity, or organization responsible for step five has a double interest in the thinking activity or processes. The individual, entity, or organization responsible for step nine has a double interest in the doing element or activity.

By contrast, the entities responsible for steps four and seven have an interest in the seeing activities and responsibility, but also in thinking and doing, respectively. By the same token, the entities responsible for steps two and eight have an interest in thinking, but also an interest in seeing and doing, respectively. Analogously, the entities responsible for steps three and six have interest in doing, but also an interest in seeing and thinking, respectively.

One may see that in moving in the direction 272, steps one, two, and three move through seeing, thinking, and doing, while having an overriding responsibility for seeing. Similarly, the elements 240 in the column constituted by steps four, five, and six have an overriding responsibility in the thinking area, while distributing themselves through seeing, thinking, and doing. The column constituted by steps seven, eight, and nine have an overriding responsibility in the doing category, while distributing themselves among seeing, thinking, and doing, respectively.

In moving in the direction of 274, one may also see a distribution of steps one, four, and seven among seeing, thinking, and doing, with an overriding responsibility for seeing. Likewise, steps two, five, and eight have an overriding responsibility to thinking processes or responsibilities, while distributing themselves among seeing, thinking and doing. Steps three, six, and nine, distribute under an overriding responsibility for doing.

Remembering the analogies, synonyms, and relationships of FIG. 11, one sees that whether moving away from step one in the direction 272 or direction 274, or moving away from step nine in the direction of 276, or direction 278, one moves from a concentration of responsibility in a single area (e.g. see and see, or do and do) into an area of mixed responsibility.

Ultimately, in step three and step seven, two somewhat disparate responsibilities exist in the element 240, of each, and no single concentration. Interestingly, in most organizations, turf battles center around allocation of resources (corresponding to step three), and in agreeing on constraints or the systems engineering disputes (corresponding to step seven). In each of these areas, there is not consolidation within a single area of responsibility. A dual responsibility exists, and is attenuated by being removed multiple steps from the entity that has the double and focused responsibility in each of those areas.

Each of the elements 280 represents a boundary. Across each boundary 280 passes an input from a previous step, into a subsequent step. One may think of a decision occurring within an individual step one-nine (an element 240) as being represented by each of the corresponding boundaries 280.

Figure 13:
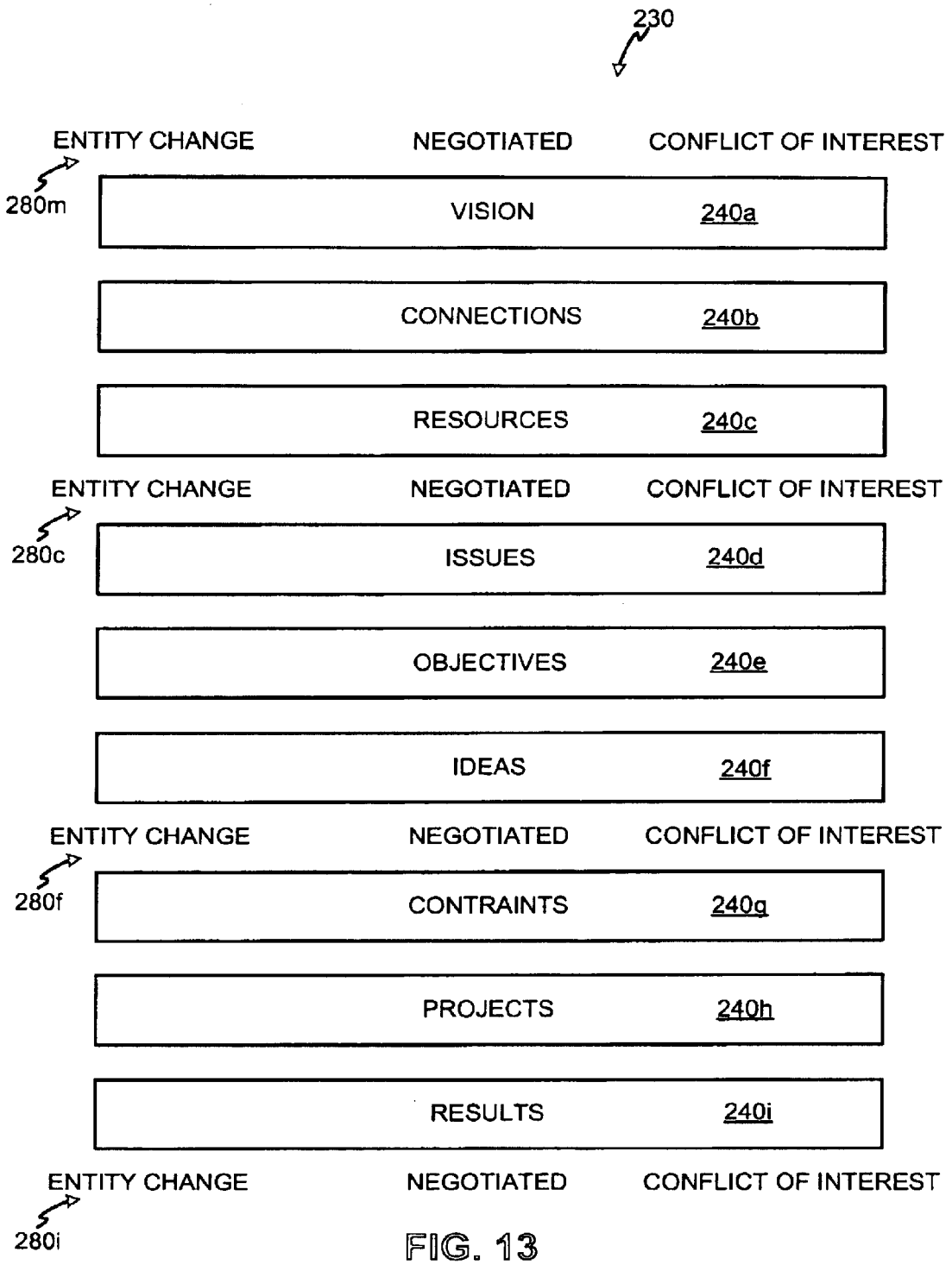
FIG. 13 is a schematic block diagram of one embodiment of a linearization of the process of FIG. 10.

Referring to FIG. 13, the matrix 230 may be linearized into a sequence of steps 240. The steps 240 or elements 240 are numbered as in the matrix 230. One may note that at the boundary between element 240c and 240d, between 240f and 240g, and between 240i and either the outside world or the next element in a recursed system, an entity change is typical. Accordingly, the boundaries 280c, 280f, 280i represent negotiated exchanges.

Thus, although the matrix 230 may be linearized, it is important to remember that across boundaries, wherein one individual, entity, or organization has responsibility or stewardship over the entire execution of the steps 240 within the matrix 230, one may typically make internal decisions in passing from one step 240 to another 240. Nevertheless, an entity change typically occurs at the boundaries 280c, 280f, 280i, and the decision is a negotiated bilateral decision constituted and exchanged following negotiation.

Due to a conflict of interest between the parties on either side of the boundaries 280, in those instances, seeking to make a unilateral decision often results in an immoral or illegal attempt to usurp the decisions of a party on the opposite side. This occurs on both sides of the boundary 280c, 280f, 280i. That is, a party on neither side of the boundary 280 is typically at liberty to make the decision unilaterally.

Figure 14:
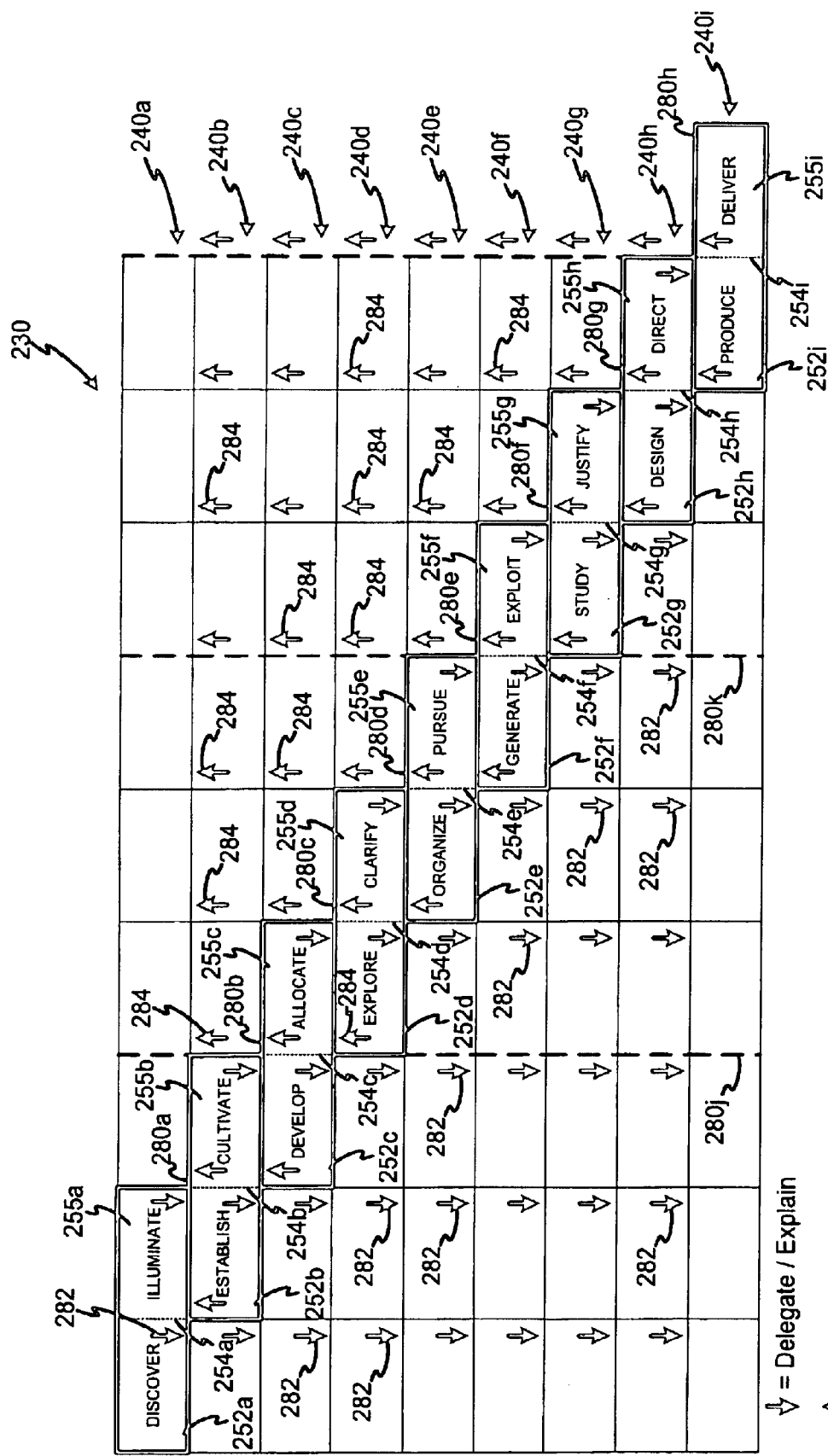
FIG. 14 is a schematic diagram illustrating the interactions and the recursive nature of processes, decisions, communications, and relationships for a process in accordance with FIG. 10.

Referring to FIG. 14, yet another alternative embodiment to the matrix 230 provides additional understanding and an explanation of the relationships between the elements 240. In the illustrated embodiment, each of the elements 240a–240i includes a respective element 262 constituting content, context, and process. That is, a low-level recursion of see 238a, think 238b, and do 238c, or of sense 269a, link 269b, and evaluate 269c is executed in each of the elements 262a. Thereafter, a decision 264 is executed. A decision 264 to go forward results in follow up 265.

As a result of the follow up 265, the entity responsible for the element 240 crosses a boundary 280 corresponding thereto, passing inputs into the next element 240. Thus, one may see that each of the processes 240a–240i or elements 240, must successfully execute and pass its contribution on the overall project and process. Accordingly, it is nearly imperative that each element 240 of the matrix 230 communicate forward 282 all three existing and previously committed decisions and processes with their inputs. This must be done at least in summary form in order that the handoff be done with belief, commitment, exchange, and so forth. Likewise, one must report backward to previous entities responsible for previous elements 240, in order that those entities responsible may redo the decisions and buy off on the idea that the system is on track.

In general, each of the communications 282 communicating forward may be thought of as delegating or explaining, to one receiving, outputs to be used as inputs in processing. Likewise, each communication 284 reporting back is responsible for reporting and coordinating with entities from whom inputs were received or instructions were obtained.

Typically, in the hierarchical nature of business organizations, communications 284 backward pass through an organization from a direct report to a superior. Likewise, communications 282 forward pass from a supervisory entity down to a direct report. Nevertheless, design reviews, product reviews, and various other business meetings are held with the specific intent to facilitate communication deeply forward 282, and to retrieve information and bring it forward to entities from far backward 284 in the organization and process to determine whether the vision announced and communicated has been clearly heard, and relied upon. Actually, each step 240 has a responsibility to communicate back 284 and forward 282 as a means of effective coordination, mid-course correction, reporting, follow up, and the like.

One benefit of the system 60, 90 is that the universe of decisions is not infinite, unknown, or unassigned. Likewise, understanding all of the nine elements 240 one may hypothesize, try, or otherwise consider decisions that will be made in the future by other entities responsible for other elements 240 in the matrix 230. That is, understanding these roles and relations of elements 240, and having facts related thereto, one may construct hypotheticals to guide in discharging one's own responsibilities.

Figure 15:
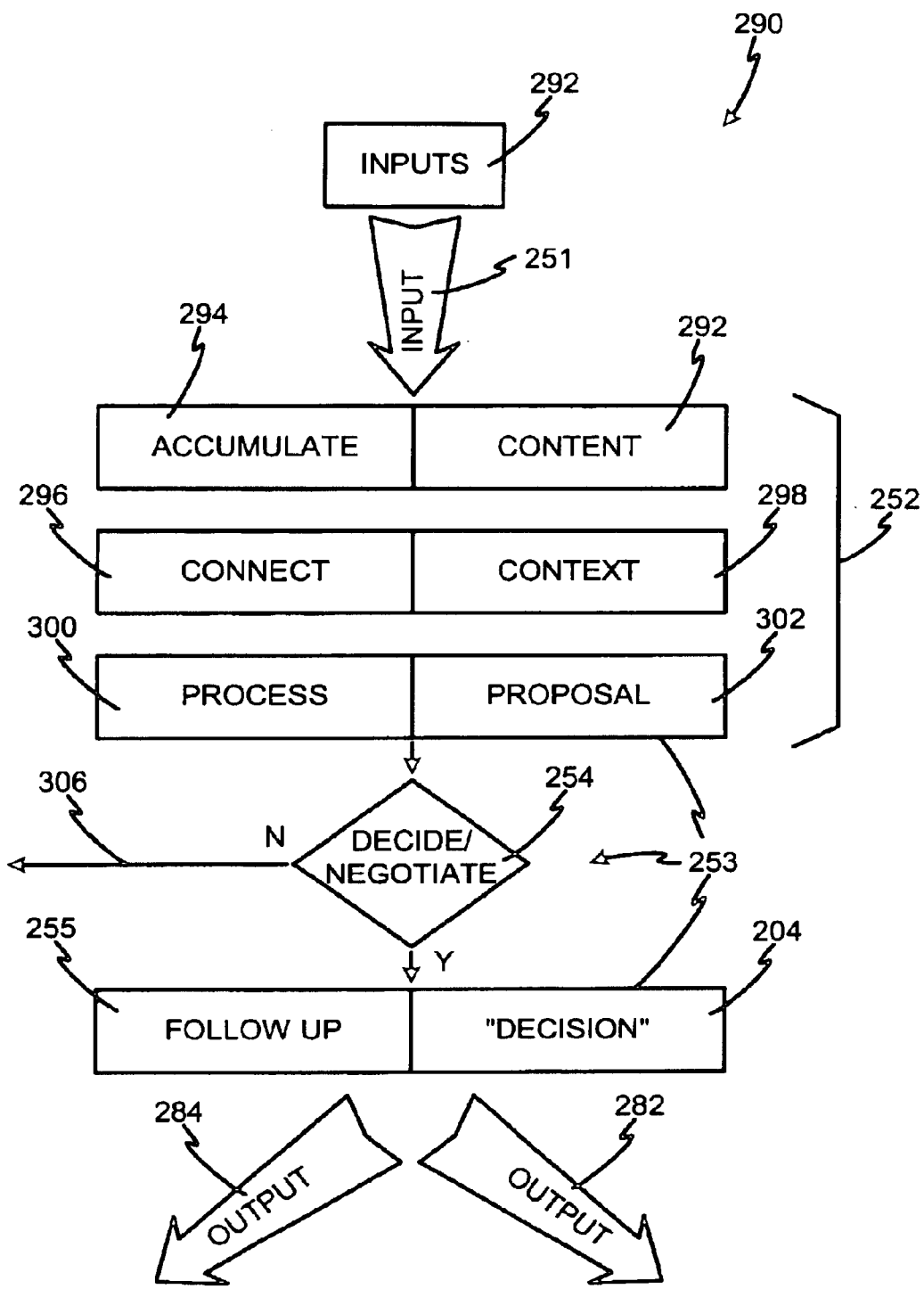
FIG. 15 is a schematic block diagram of a basic, recursive element for the processes of FIGS. 10–14.

Referring to FIG. 15, a basic unit 290 of the recursion of the system 60 and process 90, as well as the generic process 230 of the matrix 230 is illustrated in its basic structure. The unit 290, in some embodiments, may actually constitute the content 290 of an element 240. On the other hand, given the nature of recursion, and the ongoing need to flesh out details in any operation, plan, or the like, an individual element 240 may actually include recursions multiplying the number of units 290 actually contained in any element 240.

For example, at any level of stewardship or responsibility, an element 240 may include a single unit 290, a triplicate recursion of the element 290, or a triple triplicate for a full nine-element matrix 230 inside a unit 240 of a matrix 230. Thus, the unit 290 is the basic, recursive, unit of making a decision, executing the associated processes for reaching those decisions, and implementing them. Thus, the unit 290 is a universal, recursive, unique unit 290 from which a closed set may be constructed for reaching and implementing all decisions.

The unit 290 may receive inputs 292. Inputs 292 may include content in context. That is, numbers have no meaning without some measurable units and other context to provide meaning. Accordingly, the inputs 292 are input 261 into the unit 290. Accordingly, the entity responsible will accumulate 294 or collect 294 the content 292.

Thereafter, the process 262 includes linking 296 or connecting 296 the content 292 with context 298. In some embodiments, one may think of facts 298 as embodying both a content 292 and an associated context 298. After accumulating 294 content 292, linking or connecting 296 that content 292 into a context 298, and linking various contexts together to form a broader context 298, an entity responsible for the unit 290 has meaningful information on which to move forward and act.

A process 300 results in a proposal 302. The process 300 may include numerical calculations, mental evaluations, comparisons, sorting, filtering, statistical analysis, or other evaluation processes of any or all types in order to decide direction based upon the available information. The decision as to that direction is action or decision as to a proposal 302.

In a broad context or a broad interpretation, a process 300 is processing information in order to develop proposed directions 302 submitted in a proposal 302. Ultimately, the proposal 302 may also be thought of as a proposed decision. That is, the process 300 has resulted in a proposed thing to be done 302, which proposal 302 may be accepted or rejected in a decision 264.

In certain interpretations, one may actually think of the proposal 302 the decision 264 and the decision 204 as all being part of an output 263. That is, the proposal 302 has not been decided on, but is simply a proposed course 302. The decision 264 decides but typically decides to accept, or reject (believe, commit, negotiate, etc.) for the results promised by the proposal 302. Meanwhile, a decision to move forward results in follow up 265 in order to implement the decision 204. As a practical matter, the decision 204 is the proposal 302 having been decided 264 or adopted by the entity responsible.

In order to follow up 265, the content or course outlined by the proposal 302 is advanced as a decision 204 by outputting 282 forward and by reporting 284 backward to the subsequent and previous elements 240, respectively. As a practical matter, decisions 264 occur repeatedly.

The decision 264, including negotiations 264 where the decision 264 is bilateral, may be decided negatively. Accordingly, a decision 264 may result in a return 306 to the process 262, or a abandonment of the proposal 302 entirely. Thus, the path 306 or return 306 may result in quashing the proposal 302 and ceasing activities directed thereto, in further refinements through continuation of the process 262, or in passing back whatever proposal 302 existed to another entity in another unit 290 or element 240 of the matrix 230 for further resources, decisions 264 or the like.

Reviewing FIG. 15 in view of FIG. 11, the process 262 includes content, context, and process. Accordingly, the process 262 is the basic unit of recursion bounded by inputs 292 incoming 261, and a decision 264 resulting in handoff and follow up 265. Thus, the unit 290 is the basic element of see, think, and do or sense, link, and evaluate.

Figure 16:
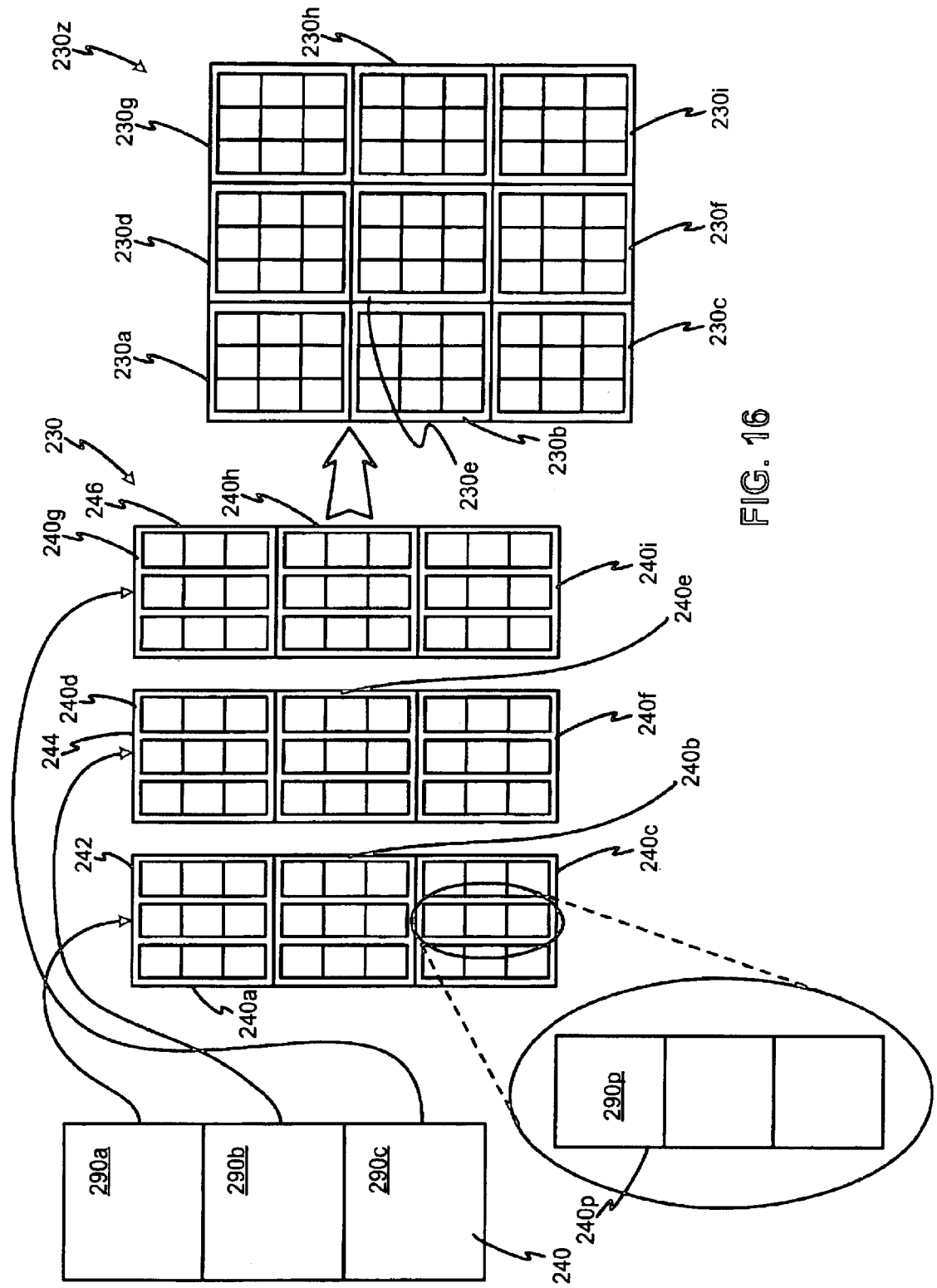
FIG. 16 is a schematic block diagram illustrating the relationships between various recursions of the elements of FIG. 15 and the processes of FIGS. 10–14.

Referring to FIG. 16, the basic concept of recursion provides a unit 290. A unit 290 may exist alone within an element 240 of the matrix 230. Nevertheless, the unit 290 may be used recursively for tasks that are oriented toward seeing, thinking, and doing. Accordingly, the unit 290 may recurse to form three units 290a, 290b, 290c filling an element 240. By the same token, the unit 290a of the element 240 may be expanded, or the element 240 may be expanded to devote a full recursive column 242, 244, 246 to each of the individual units 290a, 290b, 290c, respectively of the element 240. Each of the columns 242 may include elements 240a, 240b, 240c, and so forth to create a full matrix 230.

Meanwhile, within each of the units 240a–240i, exists a subsequent element 240p or internal recursed element 240p that may be constituted by one or more units 290b. The matrix 230 may similarly recurse upward into a more global scheme in which multiple matrices 230a–230i exist within a larger matrix 230z. Thus, the unit 290 becomes a universal, recursive unit 290 that may recurse to form a closed set of decisions and associated processes for reaching those decisions and implementing them.

Typically, an individual entity may have responsibility for a domain or stewardship of interest. Accordingly, that entity may execute the basic unit 290. To the extent that the facts, decisions, or processes become overburdening, too complicated, lack information, exceed authority, or cannot be fully executed for any reason, the entity responsible for the unit 290 may recurse down within the scope of authority and stewardship. That is, the recursive unit 290 may be recursed to form a column 242, or a series of columns 242, 244, 246. Thus, until the problems, decisions, facts, and so forth can be dissected to a point that they can be adequately handled, questions can be answered, and decisions executed, a responsible entity acting within its stewardship simply recurse and subdivide the decisions until information and decisions are adequate to come to closure.

Keeping in mind that the units 240 for step three, step six, and step nine require bilateral decisions, one entity may only recurse to the extent of controlled resources, ideas, and ability to produce results. Once resources, ideas, or results require negotiation outside the scope of authority, then negotiations must occur with peers or upward. To the extent that an entity (person, organization, machine, etc.) has the capacity to sufficiently process a matrix 230, and column 242, a unit 240, or a unit 290, then the entity may act.

In the instance where a entity determines that insufficient information or other resources have not been provided as inputs, then that entity may cause the process 290, 240, 230 to pop up to the domain in which the problems may resolved. That is, outside the domain of responsibility or stewardship of the entity in question. Thus, an individual or manager may apply to a boss or higher management for additional resources or authorization to continue recursion or for additional inputs of information material, people, and so forth to proceed. For example, decisions that have not been made, and now need to be made, or were improperly made may have to be reconsidered by those responsible. By the same token, success may be reported back at the end of a unit 290, a step 240, or execution of the matrix 230, depending upon the scope of the problem, the domain of stewardship, and the like.

Figure 17:
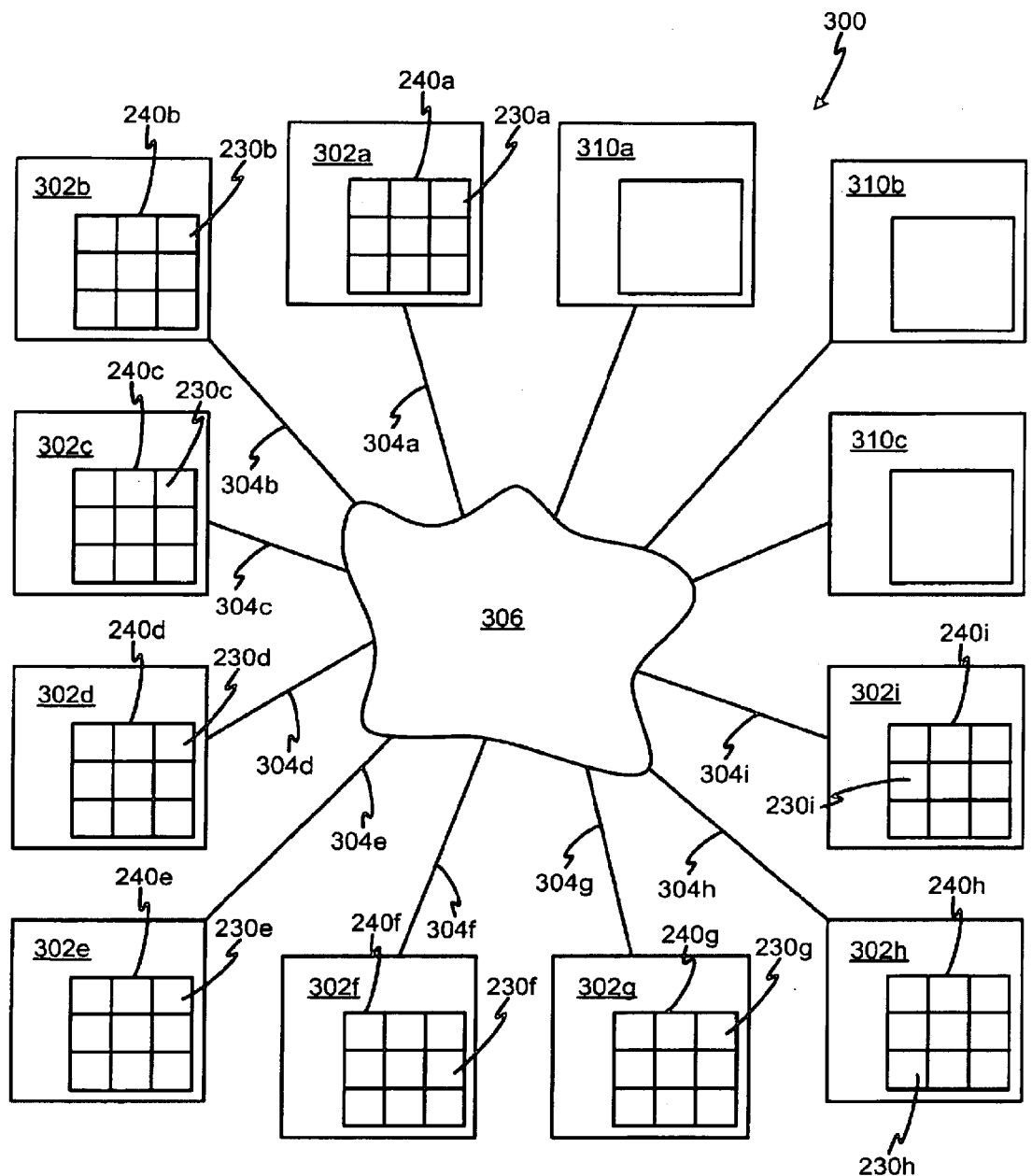
FIG. 17 is a schematic block diagram illustrating a collaborative product development process.

Referring to FIG. 17, an organization 300 or system 300 may include multiple entities 302a–302i responsible for accomplishing any function, purpose, product development, or the like. The responsibilities for individual elements 240a–240i of the enterprise at hand may be assigned to the corresponding entities 302a–302i, respectively. The entities 302 may exist at a same location, different locations, or anywhere else so long as they can communicate through connections 304a–304i, respectively through an internetwork 306. Thus, each of the entities 302a–302i can belong to an organization executing their assigned responsibilities from the matrix 230. Other entities 310 not part o the organization may be customers, sources, vendors, or other contacts related or unrelated to the work of the decision and processing matrix 230.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for computerized industrial process control, the method comprising:

providing a system comprising computers networked to communicate with one another, each computer being selectively activated to cooperatively operate and communicate with other computers in the system and comprising a processor, a memory device operably connected thereto, and a network connection for communicating with the other computers in the system;

selecting a process to be controlled and having an output corresponding thereto;

selecting an entity corresponding to each computer active in the system to be responsible for at least a portion of the process and at least one decision;

providing a set of types of activities, the set being a universal set and consisting of sensing facts, linking facts into a meaningful context, and evaluating meaning to form a decision;

assigning to each entity at least one assigned decision;

inputting facts to each entity;

conducting by each entity a series of activities selected from the three types, applied recursively;

executing and outputting by each entity the at least one assigned decision through the computer to the system;

communicating the at least one assigned decision from each entity through the system to control the process; and producing the output from the process according to a combination of the at least one decision from each entity.

2. The method of claim 1, wherein activities of each of the types recurses within itself to contain activities of each of the three types therein.

3. The method of claim 1, wherein the set of types is part of a recursion from a higher level of activity corresponding to one of the types, and wherein the higher level activity exists in a greater domain of activities encompassing the process.

4. The method of claim 1, wherein the process controlled is a manufacturing process and the output is a product.

5. The method of claim 4, wherein the product is a mechanical device.

6. The method of claim 4, wherein the product is a chemical composition.

7. The method of claim 4, wherein the product is an object previously created in a received condition, and the output is the object delivered in a changed condition with respect to the received condition.

8. The method of claim 1, wherein the output is information.

9. The method of claim 8, wherein the information is at least one employee-evaluation score.

10. The method of claim 9, wherein the process further comprises providing an employee evaluation by:

defining at least one group of persons;

including a first employee in the at least one group;

accessing the each computer by at least one second employee;

presenting questions directed to an ability of the first employee to process and implement decisions in each of nine areas, the nine areas constituting a universal, recursive, exclusive, and exhaustive set of activities directed to a corresponding decision;

receiving and processing scores corresponding to the questions, in which each score represents a numerical value scaled to compare the first employee with a standard maximum score assigned by the second employee to a member of the at least one group; and providing a score comparing the first employee to a score corresponding to the group.

11. A method for computerized industrial process control, the method comprising:

providing a system comprising computers networked to communicate with one another, each computer being selectively activated to cooperatively operate and communicate with other computers in the system and comprising a processor, a memory device operably connected thereto, and a network connection for communicating with the other computers in the system;

selecting a manufacturing process to be controlled and having an output corresponding thereto comprising a product;

selecting for each computer active in the system a designated person responsible for at least a portion of the process and at least one decision;

providing a set of types of activities, the set comprising a universal, recursive, exclusive, exhaustive set of types consisting of sensing facts, linking facts into a meaningful context, and evaluating meaning to form a decision;

assigning to the each computer at least one assigned decision corresponding to one of the types of activities;

providing inputs to the each computer;

conducting by the each computer in coordination with the designated person a series of activities selected from the three types, applied recursively;

outputting to the system by the each computer in coordination with the designated person the at least one assigned decision;

communicating the at least one assigned decision to at least one second computer in the system identified to receive outputs from the each computer; and producing the output from the process according to a combination of the at least one decision from each entity.

12. The method of claim 11, further comprising reporting by the each computer the assigned decision to at least one third computer responsible to provide inputs to the each computer.

13. The method of claim 11, wherein the output is a product, the method further comprising delivering custody of the product to a third party, independent from the entity producing the output, for inspection with respect to compliance with constraints.

14. The method of claim 13, further comprising delivering the product to the third party in an exchange for compensation.

15. The method of claim 14, wherein the product is selected from the group consisting of a chemical composition, a manufactured hardware device, information, a gathered resource, and a software application.

16. The method of claim 15 wherein the output is information comprising an evaluation of personnel based on nine factors consisting of an ability to process and follow up on the nine factors consisting of vision, connections, resources, issues, objectives, ideas, constraints, projects, and results.

17. A method of automated, computerized collection and processing of personnel evaluations, the method comprising:

providing computers networked to communicate with each other;

programming the computers with a software application to present questions, collect answers, and process scores corresponding to the answers;

defining at least one group of persons;

including a first employee in the at least one group;

accessing the at least one computer of the computers by at least one second employee;

presenting by the at least one computer questions directed to an ability of the first employee in each area of a set of areas, the areas constituting an exhaustive set of activities to be measured and lying within the scope of responsibility of the first employee;

receiving and processing scores corresponding to the questions, in which each score represents a numerical value scaled to compare the first employee with a standard maximum score assigned by the second employee to a member of the at least one group; and providing a score comparing the first employee to a standard corresponding to the group.

18. The method of claim 17 wherein the questions comprise requesting a score corresponding to an evaluation of the first employee based on an ability to process and follow up on decisions in each area of the set of areas.

19. The method of claim 18, wherein the each decision corresponds to one of a universal and closed set of activities for processing, deciding, and following up on decisions.

20. The method of claim 19 wherein the closed set corresponds to nine areas consisting of vision, connections, resources, issues, objectives, ideas, constraints, projects, and results.

* * * * *